(12) United States Patent
Kogure et al.

(10) Patent No.: US 9,193,388 B2
(45) Date of Patent: Nov. 24, 2015

(54) SUSPENSION DEVICE

(71) Applicant: Fuji Jukogyo Kabushiki Kaisha, Tokyo (JP)

(72) Inventors: Masaru Kogure, Tokyo (JP); Yuichiro Tsukasaki, Tokyo (JP); Masahiro Saito, Tokyo (JP); Kazuya Morota, Tokyo (JP); Kenji Watanuki, Tokyo (JP); Toshiyuki Hyuga, Tokyo (JP); Daisuke Yamada, Tokyo (JP); Kensuke Ohshima, Tokyo (JP); Yoshiaki Utsugi, Tokyo (JP); Masato Nakatake, Tokyo (JP); Takashi Kogure, Tokyo (JP); Kazuya Ando, Tokyo (JP); Hidehisa Tomizawa, Tokyo (JP); Masashi Imoto, Tokyo (JP); Toshi Ishida, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/227,156

(22) Filed: Mar. 27, 2014

(65) Prior Publication Data
US 2014/0291944 A1     Oct. 2, 2014

(30) Foreign Application Priority Data

| Mar. 28, 2013 | (JP) | 2013-070002 |
| Mar. 28, 2013 | (JP) | 2013-070030 |
| Mar. 28, 2013 | (JP) | 2013-070063 |
| Mar. 28, 2013 | (JP) | 2013-070097 |
| Mar. 28, 2013 | (JP) | 2013-070136 |
| Mar. 28, 2013 | (JP) | 2013-070155 |
| Mar. 28, 2013 | (JP) | 2013-070191 |

(51) Int. Cl.
*B62D 17/00* (2006.01)
*B60G 17/016* (2006.01)
*B60G 3/20* (2006.01)

(52) U.S. Cl.
CPC *B62D 17/00* (2013.01); *B60G 3/20* (2013.01); *B60G 17/0162* (2013.01); *B60G 17/0163* (2013.01); *B60G 2200/18* (2013.01); *B60G 2200/4622* (2013.01)

(58) Field of Classification Search
CPC ........... B62D 17/00; B60G 2200/4622; B60G 17/0162; B60G 17/0163
USPC .................... 701/37; 280/5.522, 5.523, 5.524
See application file for complete search history.

(56) References Cited

U.S. PATENT DOCUMENTS

| 4,519,627 A | * | 5/1985 | Shibahata et al. | 280/5.524 |
| 4,706,989 A | * | 11/1987 | Iijima et al. | 280/5.524 |

(Continued)

FOREIGN PATENT DOCUMENTS

JP     2011-057021 A     3/2011

*Primary Examiner* — Ruth Ilan
(74) *Attorney, Agent, or Firm* — Troutman Sanders LLP

(57) ABSTRACT

A suspension device has longitudinal force compliance steer properties to steer a rear wheel to toe-in or toe-out according to increase in longitudinal force applied to wheel treads of a rear wheel. The suspension device includes: a hub bearing housing; suspension links having both edges pivotally attached to a vehicle body and a hub bearing respectively, to support the hub bearing housing; a suspension spring generating reaction force corresponding to relative displacement amount in the longitudinal direction of the hub bearing housing as to the vehicle body; a damper generating damping force corresponding to relative speed in the longitudinal direction of the hub bearing housing as to the vehicle body; and a toe change generating unit generating toe change in a direction where toe change due to longitudinal force compliance properties is temporarily cancelled out or suppressed at an early stage of turning of the vehicle.

20 Claims, 38 Drawing Sheets

(56) References Cited

U.S. PATENT DOCUMENTS

| | | | |
|---|---|---|---|
| 4,758,018 A * | 7/1988 | Takizawa et al. | 280/124.133 |
| 5,098,116 A * | 3/1992 | Edahiro et al. | 280/5.524 |
| 5,975,541 A * | 11/1999 | Harara et al. | 280/5.524 |
| 6,241,262 B1 * | 6/2001 | Suess | 280/5.522 |
| 6,938,908 B2 * | 9/2005 | Oda et al. | 280/124.109 |
| 7,747,359 B2 * | 6/2010 | Katrak et al. | 701/1 |
| 7,954,827 B2 * | 6/2011 | Maruyama et al. | 280/5.522 |
| 8,050,819 B2 * | 11/2011 | Suyama et al. | 701/37 |
| 8,073,592 B2 * | 12/2011 | Nishimori et al. | 701/39 |
| 8,342,542 B2 * | 1/2013 | Sagara et al. | 280/5.524 |
| 8,463,506 B2 * | 6/2013 | Yanagi et al. | 701/49 |
| 8,910,952 B2 * | 12/2014 | Yoo et al. | 280/5.522 |
| 8,960,690 B2 * | 2/2015 | Hinohara et al. | 280/5.524 |
| 2007/0273117 A1 * | 11/2007 | Kwon | 280/86.75 |
| 2008/0054577 A1 * | 3/2008 | Horiuchi | 280/5.522 |
| 2009/0140502 A1 * | 6/2009 | Sasaki et al. | 280/5.522 |
| 2009/0243237 A1 * | 10/2009 | Sasaki | 280/5.524 |
| 2010/0052271 A1 * | 3/2010 | Vaxelaire et al. | 280/5.524 |
| 2010/0066040 A1 * | 3/2010 | Suyama | 280/5.522 |
| 2010/0263961 A1 * | 10/2010 | Horiuchi | 180/445 |
| 2010/0289229 A1 * | 11/2010 | Post et al. | 280/5.524 |
| 2011/0042907 A1 * | 2/2011 | Lee et al. | 280/5.522 |
| 2012/0010781 A1 * | 1/2012 | Suyama et al. | 701/37 |
| 2014/0008141 A1 * | 1/2014 | Kageyama et al. | 180/400 |

* cited by examiner

SUSPENSION DEVICE

CROSS-REFERENCE TO RELATED APPLICATIONS

The present application claims priority from Japanese Patent Application Nos. 2013-070155, 2013-070002, 2013-070030, 2013-070097, 2013-070191, 2013-070063, and 2013-070136, all filed on Mar. 28, 2013, the entire contents of which are hereby incorporated by reference.

BACKGROUND

1. Technical Field

The present invention relates to a suspension device for vehicle rear wheels, and particularly relates to a suspension device for vehicle rear wheels configured to enable influence of longitudinal force compliance steer generated at an early stage of turning to be suppressed or cancelled out.

2. Related Art

A suspension device for rear wheels of a vehicle such as a vehicle or the like is configured to support hub bearing housings configured to turnably support a rear wheel, via a suspension link (link) pivotally attached to the vehicle body so as to able to stroke in the longitudinal direction.

Such a suspension device for rear wheels preforms, as an example, positioning in the camber directions of the rear wheels using longitudinal pairs of lateral links, and also performing positioning in the toe directions by disposing the pair of lower side lateral links in a manner separated forward and backward.

An example of such a suspension device for rear wheels is disclosed in Japanese Unexamined Patent Application Publication (JP-A) No. 2011-57021. This suspension device performs positioning of the hub bearing housings using front and rear lateral links (lower links) and trailing links pivotally attached to a sub frame to be attached to a rear underfloor of a vehicle body.

One or both end portions of each of these links are connected to the vehicle body or hub bearing housing via a rubber bush for vibration proofing. For example, in the case of lateral force being applied to a vehicle at the time of turning of the vehicle, there is generated lateral force compliance steer in which the toe angle of a rear wheel is changed to either of the toe-in and toe-out directions due to deformation amount difference between the rubber bushes of the front and rear lateral links.

In general, it is desirable that, at the time of turning of a vehicle, the turning outer wheel side has a tendency to toe in, and the turning inner wheel side has a tendency to toe out, and accordingly, rigidities of the rubber bushes of the front and rear lateral links are frequently set such that displacement amount as to lateral force is greater at the front side than at the rear side.

Also, the geometric layout (geometry) of the links making up the suspension may frequently apply bump steer properties such that the turning outer wheel side, that is, bump side (compressed side) has a tendency to toe in, and the turning inner wheel side, that is, the rebound side (expanded side) has a tendency to toe out.

However, in the case of a suspension exhibiting lateral force compliance steer such that, at an early stage of turning, according to lateral force at the time of turning as described above, the outer wheel side toes in, and the inner wheel side toes out, there may be exhibited a tendency in which, according to compliance steer (longitudinal force compliance steer) due to longitudinal force, the outer wheel side toes out, and the inner wheel side toes in.

Thereafter, upon lateral force increasing, and also a suspension stroke starting to generate lateral force compliance steer and bump steer, finally the outer wheel side has a tendency to toe in, and the inner wheel side has a tendency to toe out, but steering stability is deteriorated by the rear wheels being steered to the inverse phase temporarily at an early stage of turning.

SUMMARY OF THE INVENTION

The present invention has been designed in consideration of the circumstances described above, and an object thereof is to provide a suspension device for rear wheels configured to enable influence of longitudinal force compliance steer generated at an early stage of turning to be suppressed or cancelled out.

An aspect of the present invention provides a suspension device with longitudinal force compliance steer properties to steer a rear wheel of a vehicle to either of the toe-in and toe-out sides according to increase in longitudinal force applied to wheel treads of the rear wheel. The suspension device includes: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit configured to generate toe change in a direction where toe change due to the longitudinal force compliance steer properties is temporarily cancelled out or suppressed at an early stage of turning of the vehicle.

The toe change generating unit may include a braking/driving force difference generating unit to generate braking/driving force difference between both rear wheels.

The suspension device may have toe-out properties due to the tie rods being situated behind the wheel center, to change the hub bearing housing in the toe-out direction according to braking force applied to the wheel center. The braking/driving force difference generating unit may include a driving unit to enable driving force of both wheels to be independently controlled to increase driving force on the turning outer wheel side as compared to driving force on the turning inner wheel side.

The suspension device may have toe-out properties due to the tie rods being situated behind the wheel center, to change the hub bearing housing in the toe-out direction according to braking force applied to the wheel center. The braking/driving force difference generating unit may include a braking unit to enable braking force of both wheels to be independently controlled to decrease braking force on the turning outer wheel side as compared to braking force on the turning inner wheel side.

The suspension device may have toe-out properties due to the tie rods being situated behind the wheel center, to change the hub bearing housing in the toe-out direction according to braking force applied to the wheel center. The braking/driving force difference generating unit may include a driving unit to enable driving force of both wheels to be independently controlled, and a braking unit configured to enable braking force of both wheels to be independently controlled to apply braking force to the turning inner wheel and also to apply driving force to the turning outer wheel.

The driving unit may include a driving motor provided to each of both rear wheels.

The toe change generating unit may perform generation control of the toe change such that toe change amount changes according to vertical load change of the rear wheels.

The toe change generating unit may gradually reduce toe change amount at the time of ending the occurrence of toe change.

The toe change generating unit may terminate generation of the toe change in response to the strokes of the suspension spring and the damper reaching equal to or greater than a predetermined value.

Another aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a rear wheel steering actuator to apply a steer angle to the rear wheel. The rear wheel steering actuator applies a steer angle to the rear wheel in a direction where toe change due to the longitudinal force compliance steer properties is temporarily cancelled out or suppressed at an early stage of turning of the vehicle.

The rear wheel steering actuator may perform the steer angle application to the rear wheel so as to gradually change the steer angle according to vertical load change of the rear wheel.

The rear wheel steering actuator may gradually reduce the steer angle at the time of ending application of the steer angle.

The rear wheel steering actuator may terminate application of the steer angle in response to the strokes of the suspension spring and the damper reaching equal to or greater than a predetermined value.

An aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a damping control unit to decrease damping force of the damper temporarily at an early stage of turning of the vehicle.

The damping control unit may terminate decrease of the damping force in response to the strokes of the suspension spring and the damper reaching equal to or greater than a predetermined value.

Another aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; a stabilizer to generate reaction force according to stroke difference between the damper at the left and the damper at the right; and a roll rigidity control unit to decrease roll rigidity of the stabilizer temporarily at an early stage of turning of the vehicle.

The roll rigidity control unit may terminate decrease of the roll rigidity in response to the strokes of the suspension spring and the damper reaching equal to or greater than a predetermined value.

Another aspect of the present invention is a suspension device with longitudinal force compliance steer properties to steer a rear wheel of a vehicle to the toe-in side or toe-out side according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit to generate toe change in a direction where toe change due to the longitudinal force compliance steer properties is temporarily cancelled out or suppressed at an early stage of turning of the vehicle. The toe change generating unit includes a stroke control unit configured to forcibly stroke the damper on the turning outer wheel side to the compression side.

Another aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit to generate toe change in a direction where toe change due to the longitudinal force compliance steer properties is temporarily cancelled out or suppressed at an early stage of turning of the vehicle. The toe change generating unit includes a load applying unit configured to apply compressive load to the damper on the turning outer wheel side.

The toe change generating unit may terminate generation of the toe change in response to load to be loaded to the damper on the turning outer wheel side reaching equal to or greater than a predetermined value.

Another aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit to generate toe change in a direction where toe change due to the longitudinal force compliance steer properties is temporarily cancelled out or suppressed at an early stage of turning of the vehicle. The toe change generating unit includes a roll moment generating unit to generate a roll moment in a direction where the damper on the turning outer wheel side is compressed.

The toe change generating unit may terminate generation of the toe change in response to the strokes of the suspension spring and the damper reaching equal to or greater than a predetermined value.

Another aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit to generate toe change in a direction where toe change due to the longitudinal force compliance steer properties is temporarily cancelled out or suppressed at an early stage of turning of the vehicle. The toe change generating unit includes a mount rigidity control unit to temporarily increase rigidity of a variable rigidity elastic mount to be provided between the upper end portion of the damper and the vehicle, at an early stage of turning.

The mount rigidity control unit may restore the rigidity of the variable rigidity elastic mount to a state before start of turning in response to the strokes of the damper reaching equal to or greater than a predetermined value.

Another aspect of the present invention is a suspension device including: a hub bearing housing to turnably support the rear wheel of the vehicle on the circumference of the axle; a suspension link of which both edges are pivotally attached to a vehicle body and a hub bearing respectively, the suspension link configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a rigidity changing unit. The suspension link performs positioning of the toe direction of the housing, and also includes a front lateral link and a rear lateral link each having an elastic bush at least on one of an end portion of the vehicle body side, and an end portion of the hub bearing housing side, the lateral links being configured to receive tensile force due to vertical load of the rear wheel at the time of straight advance of the vehicle. The rigidity changing unit relatively increases rigidity of the rubber bush of the front lateral link temporarily at an early stage of turning as to rigidity of the rubber bush of the rear lateral link.

The rigidity changing unit may restore the rigidity of the rubber bush to a state before start of turning in response to the strokes of the suspension spring and the damper reaching equal to or greater than a predetermined value.

An aspect of the present invention is a suspension device with longitudinal force compliance steer properties to steer a rear wheel of a vehicle to either of the toe-in and toe-out sides according to increase in longitudinal force applied to wheel treads of the rear wheel, the suspension device including: a hub bearing housing to turnably support the rear wheel of the vehicle on the circumference of the axle; a suspension link of which both edges are pivotally attached to a vehicle body and a hub bearing respectively, the suspension link being configured to support the hub bearing housing so as to able to stroke as to the vehicle body; a suspension spring to generate reaction force corresponding to relative displacement amount in the longitudinal direction of the hub bearing housing as to the vehicle body; a damper to generate damping force corresponding to relative speed in the longitudinal direction of the hub bearing housing as to the vehicle body; and a toe change generating unit to generate toe change in a direction where toe change due to the longitudinal force compliance steer properties is temporarily cancelled out or suppressed at an early stage of turning of the vehicle. The toe change generating unit is provided to some of the suspension links, and temporarily changes a spring constant of a variable rigidity bush which enables the hub bearing housing to turn in either of the toe-in and toe-out directions, at an early stage of turning by changing the spring constant.

The toe change generating unit may terminate generation of the toe change in response to the strokes of the suspension spring and the damper reaching equal to or greater than a predetermined value.

DETAILED DESCRIPTION

The present invention provides a suspension device for rear wheels which enables influence of longitudinal force compliance steer generated at the initial stage of turning to be suppressed or cancelled out by applying braking/driving force difference of both wheels in a direction where longitudinal force compliance steer is cancelled out until the suspension stroke reaches equal to or greater than a predetermined value immediately after start of steering, or the like.

First Implementation

Figure 1:
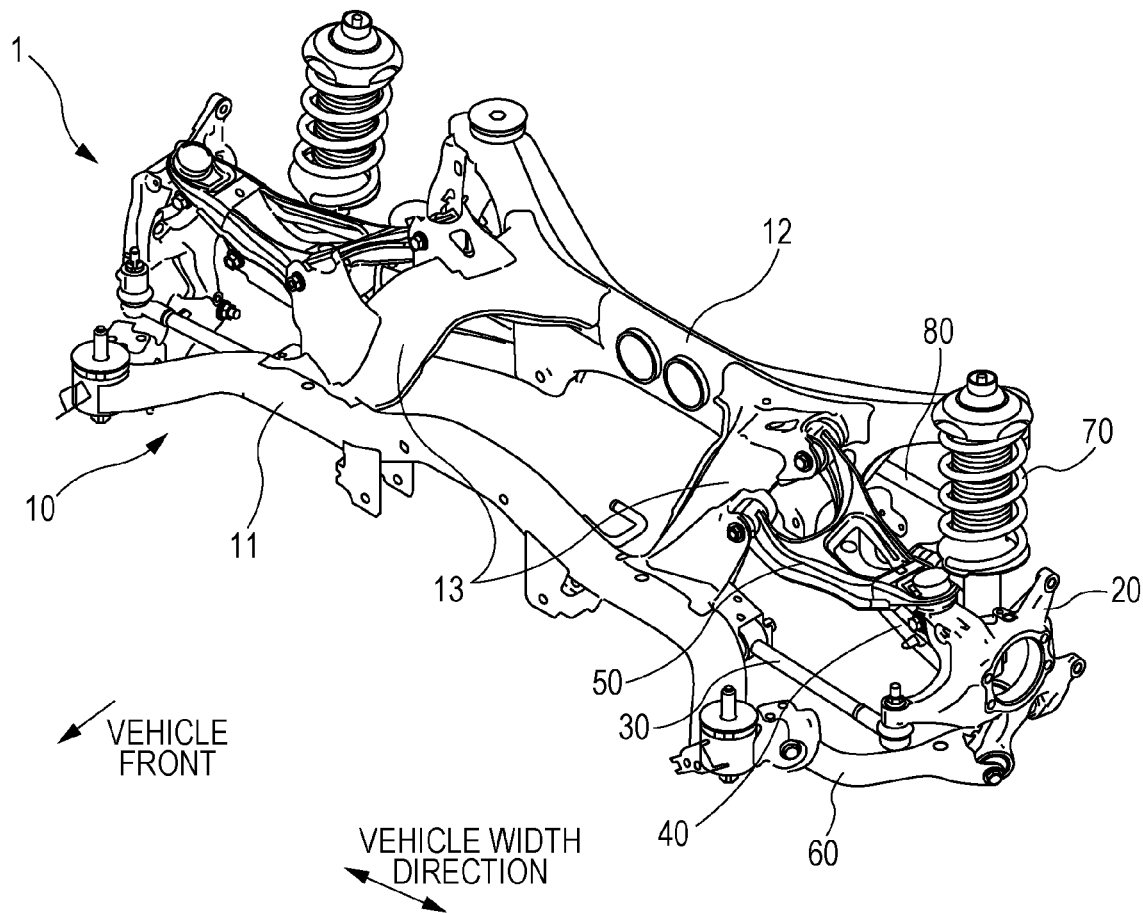
FIG. 1 is a perspective view as viewed from the front side of a suspension device to which a first implementation of the present invention has been applied.
Figure 2:
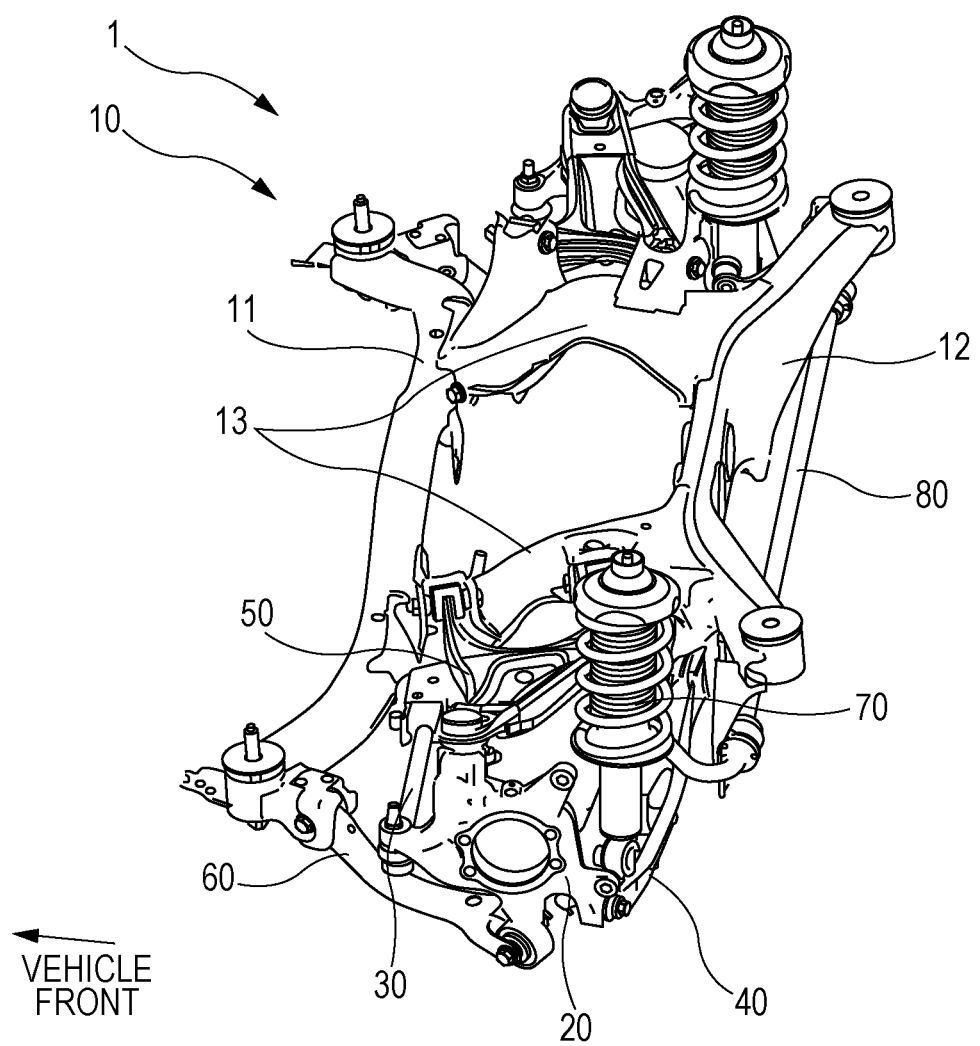
FIG. 2 is a perspective view as viewed from the rear side of the suspension device according to the first implementation.
Figure 3:
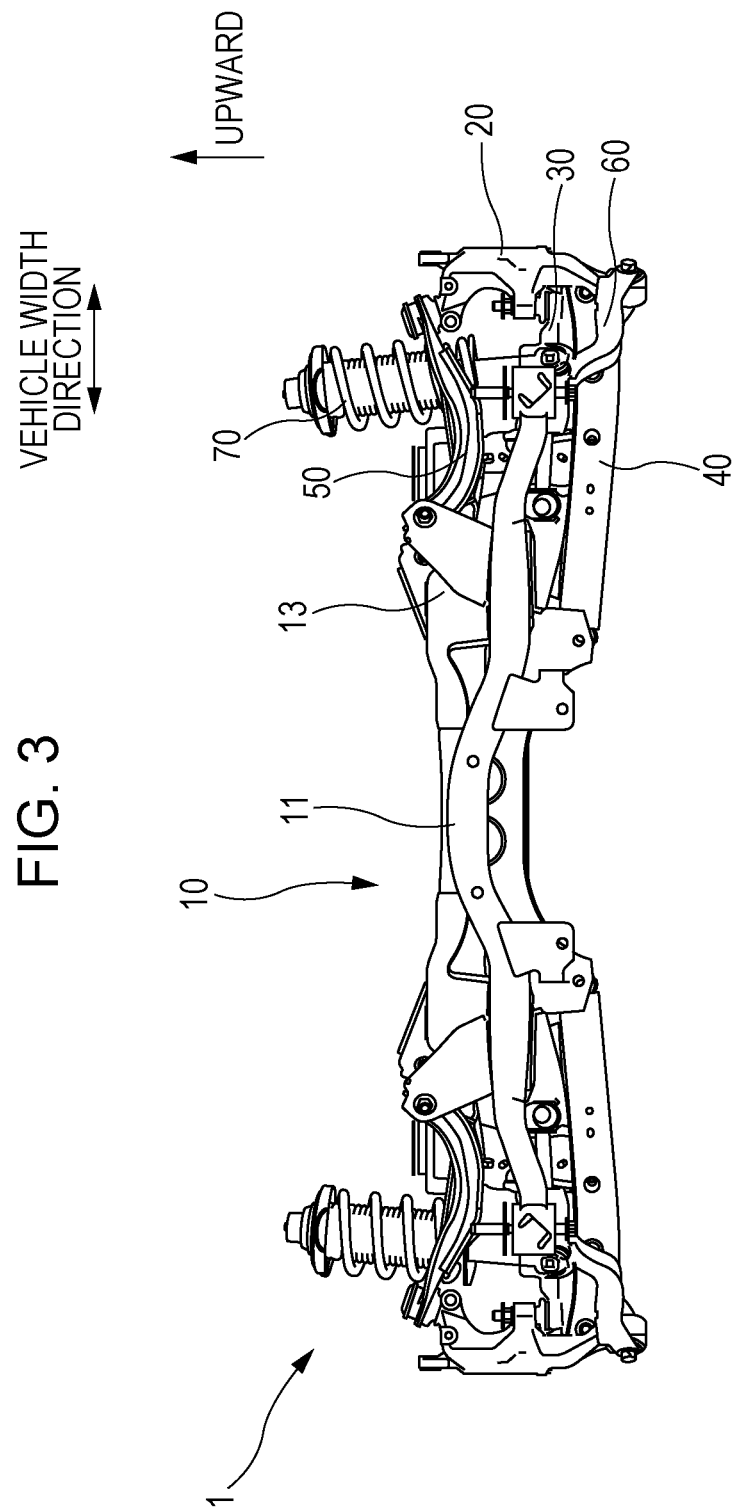
FIG. 3 is a diagram as viewed from the front of the suspension device according to the first implementation.
Figure 4:
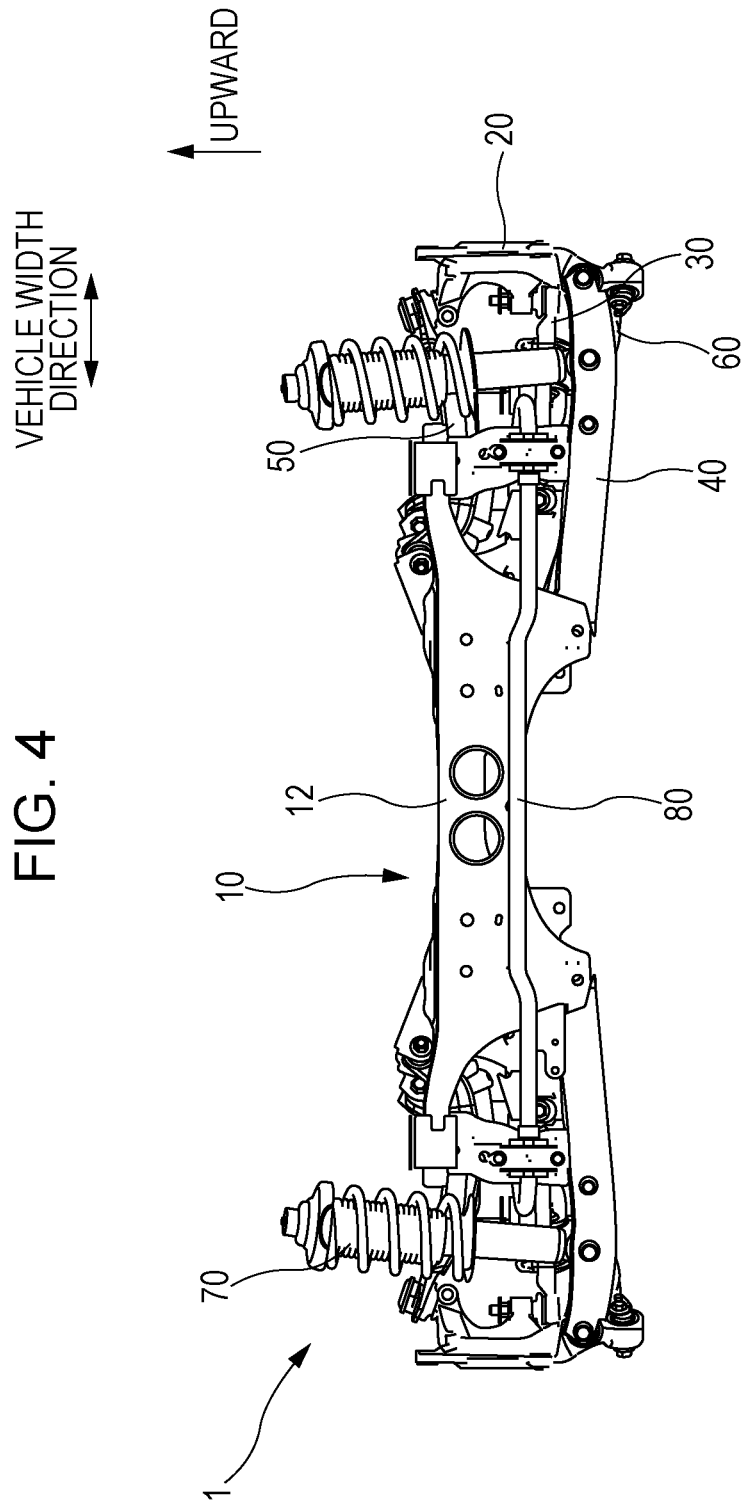
FIG. 4 is a diagram as viewed from the back of the suspension device according to the first implementation.
Figure 5:
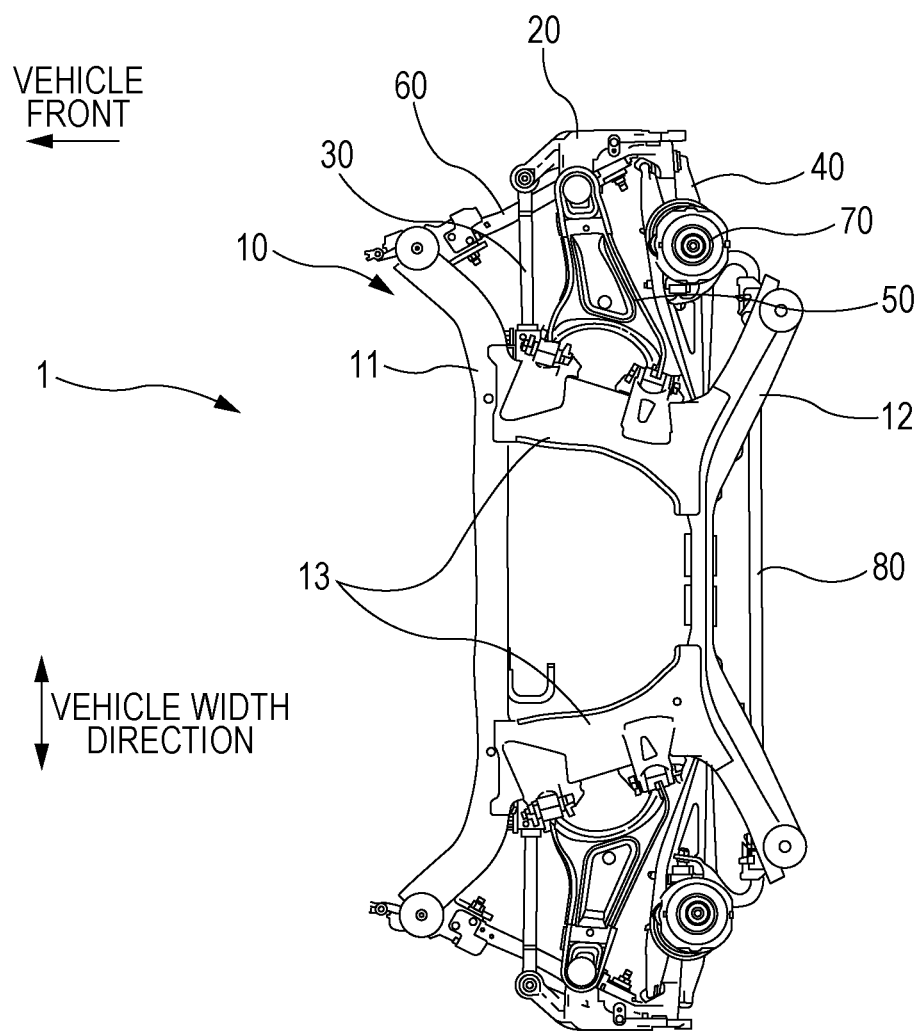
FIG. 5 is a diagram as viewed from the upward of the suspension device according to the first implementation.
Figure 6:
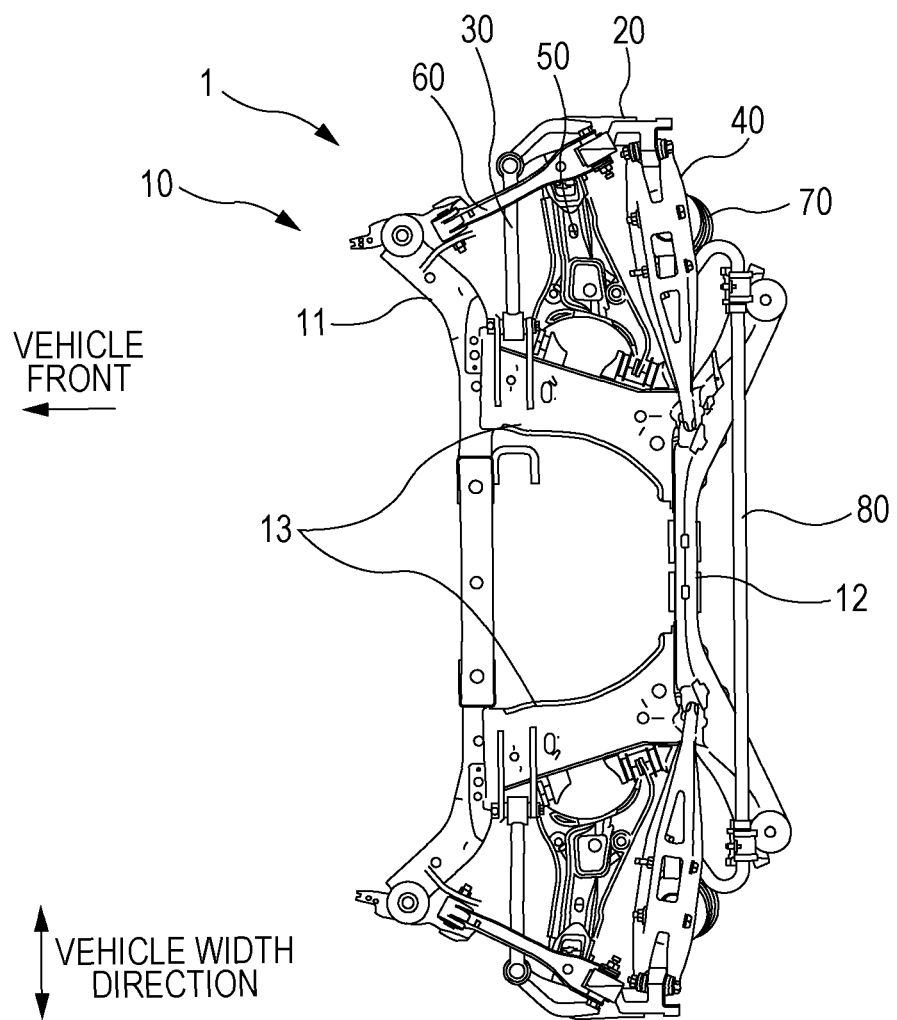
FIG. 6 is a diagram as viewed from the downward of the suspension device according to the first implementation.
Figure 7:
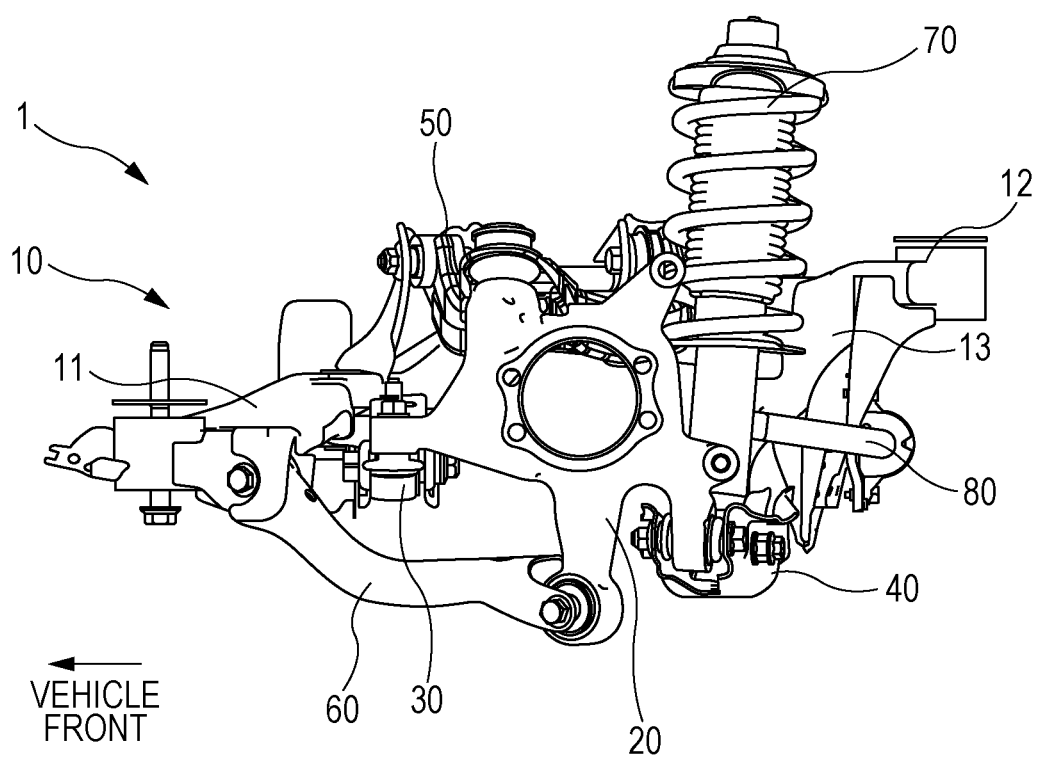
FIG. 7 is a diagram as viewed from the side of the suspension device according to the first implementation.

Hereinafter, description will be made regarding a suspension device 1 to which a first implementation of the present invention has been applied. The suspension device 1 according to the first implementation is a double wishbone type suspension provided for rear wheels of a vehicle, for example, such as a four-wheel passenger car or the like. FIG. 1 is a perspective view as viewed from the front side of the suspension device 1 according to the first implementation, FIG. 2 is a perspective view as viewed from the rear side of the suspension device 1 according to the first implementation, FIG. 3 is a diagram as viewed from the front of the suspension device 1 according to the first implementation, FIG. 4 is a diagram as viewed from the back of the suspension device 1 according to the first implementation, FIG. 5 is a diagram as viewed from the upward of the suspension device 1 according to the first implementation, FIG. 6 is a diagram as viewed from the downward of the suspension device 1 according to the first implementation, and FIG. 7 is a diagram as viewed from the side of the suspension device 1 according to the first implementation.

The suspension device 1 includes a sub frame 10, a housing 20, a front lateral link 30, a rear lateral link 40, an upper link 50, a trailing link 60, a damper unit 70, a stabilizer 80, and so forth.

The sub frame 10 is a structural member serving as a base to which the links of the suspension device 1 are attached, and is attached to a rear underfloor of a vehicle body which is not illustrated, via a sub frame bush having vibration-proof rubber. The sub frame 10 includes a front member 11, a rear member 12, a side member 13, and so forth. The front member 11 is provided to the front end portion of the sub frame 10, and is a beam-like member disposed generally in the vehicle width direction. Both end portions of the front member 11 are attached to the vehicle body via a sub frame bush. The rear member 12 is provided to the rear end portion of the sub frame 10, and is a beam-like member disposed generally in the vehicle width direction. Both end portions of the rear member 12 are attached to the vehicle body via a sub frame bush. The side member 13 is a beam-like member configured to connect a portion in the vicinity of the side end portion of the front member 11, and a portion in the vicinity of the side end portion of the rear member 12 generally in the forward and backward direction of the vehicle. The side member 13 is provided with a left and right pair separated in the vehicle width direction.

The housing 20 is a member housing a hub bearing turnably supporting a hub to which a wheel is attached. The suspension device 1 supports the housing 20 so as to able to stroke as to the sub frame 10 in the longitudinal direction along a predetermined path.

The front lateral link 30 and rear lateral link 40 are provided over between the lower portion of the side member 13 and the lower portion of the housing 20. The front lateral link 30 and rear lateral link 40 are separately disposed generally in the vehicle width direction and also in the forward and backward direction of the vehicle. Both end portions of the front lateral link 30 and rear lateral link 40 are pivotally connected to the side member 13 and housing 20 via a rubber bush for vibration-proofing, respectively.

The upper link 50 is provided over between the upper portion of the side member 13 and the upper portion of the housing 20. The upper link 50 is disposed generally in the vehicle width direction. Both end portions of the upper link 50 are pivotally connected to the side member 13 and housing 20 via a rubber bush for vibration-proofing and a ball joint, respectively.

The trailing link 60 is provided over between the vicinity of the side end portion of the front member 11 and the lower portion of the housing 20. The trailing link 60 is disposed generally in the vehicle forward and backward direction. Both end portions of the trailing link 60 are pivotally connected to the front member 11 and housing 20 via a rubber bush for vibration-proofing.

The damper unit 70 is a unit obtained by unitizing a damper configured to generate damping force according to expansion/contraction speed, and a coil spring configured to generate spring reaction force according to expansion/contraction amount. The upper end portion of the damper unit 70 is attached to the vehicle, which is not illustrated, via a top mount having rubber for vibration-proofing. The lower end portion of the damper unit 70 is attached to the rear lateral link 40.

The stabilizer 80 is an anti-roll device configured to generate spring reaction force in a direction where difference between the left and right strokes is reduced in the case that a stroke in an opposite direction (opposite phase) occurs at the left and right of the suspension device 1. Both ends of a stabilizer bar of the stabilizer 80, which is formed of spring steel, and the intermediate portion of which is disposed generally in the vehicle width direction, are connected to the left and right rear lateral links 40 via a link, respectively.

The rigidity of each bush of the suspension device 1 described above is set so as to have lateral force compliance steer properties in which the turning outer wheel side has a tendency to toe in and the turning inner wheel side has a tendency to toe out according to elastic deformation of the bushes of the front lateral link 30 and rear lateral link 40 due to lateral force by turning. Specifically, the rigidity in the lateral direction of the rubber bush of the front lateral link 30 is set lower than the rigidity in the lateral direction of the rubber bush of the rear lateral link 40.

Also, the suspension device 1 has bump steer properties in which, due to geometry of the links, when the rear wheel strokes in a direction to ascend as to the vehicle body (bump side), the rear wheel is steered to the toe-in side, and when the rear wheel strokes in a direction to descend as to the vehicle body (rebound side), the rear wheel is steered to the toe-out side. According to the above lateral force compliance steer properties and bump steer properties, while the vehicle is under steady turning, the outer wheel is steered to the toe-in side, and the inner wheel is steered to the toe-out side.

Also, the suspension device 1 has toe-out properties due to the tie rods being situated behind the wheel center, in which at the time of applying braking force to the wheel center of a rear wheel, the rear wheel is steered to the toe-out direction.

On the other hand, tensile load is loaded to the front lateral link 30 and rear lateral link 40 in a straight-ahead state of the vehicle due to vertical load of the rear wheels. Though moment to roll the vehicle is generated at the initial stage of turning of the vehicle, there is a region where no suspension stroke has been started due to sticking of the damper, or the like. Though influence of lateral force compliance steer and bump steer does not substantially occur in such a region, vertical load increases on the turning outer wheel side, and vertical load decreases on the turning inner wheel side. Thus, tensile load applied to the front lateral link 30 and rear lateral link 40 increases on the turning outer wheel side, and decreases on the turning inner wheel side. Since the lateral rigidity of the rubber bush of the front lateral link 30 side is lower than that of the rear lateral link 40 side, the displacement amount of the housing 20 due to change of such tensile load increases on the front side greater than on the rear side. Thus, longitudinal force compliance steer properties occur in which the turning outer wheel is steered to the toe-out side, and the turning inner wheel is steered to the toe-in side.

As described above, while influence of longitudinal force compliance steer is strongly manifested at the initial stage of turning, influence of lateral force compliance steer and bump steer is not readily manifested, and accordingly, the turning outer wheel is steered to the toe-out side, and the turning inner wheel is steered to the toe-in side. Thereafter, when the damper unit 70 starts the stroke, upon lateral force applying to the front lateral link 30 and rear lateral link 40, lateral force compliance steer and bump steer are strongly influenced, and the turning outer wheel is returned to the toe-in side, and the turning inner wheel is returned to the toe-out side. As described above, upon the rear wheels being steered to the opposite direction at the time of the initial stage of turning and the steady turning, there may be undesirable effects on the steering stability of the vehicle. Therefore, toe correction control for generating toe change in a direction where longitudinal force compliance steer at the initial stage of turning is reduced or cancelled out is performed in the first implementation. Hereinafter, this point will be described.

Figure 8:
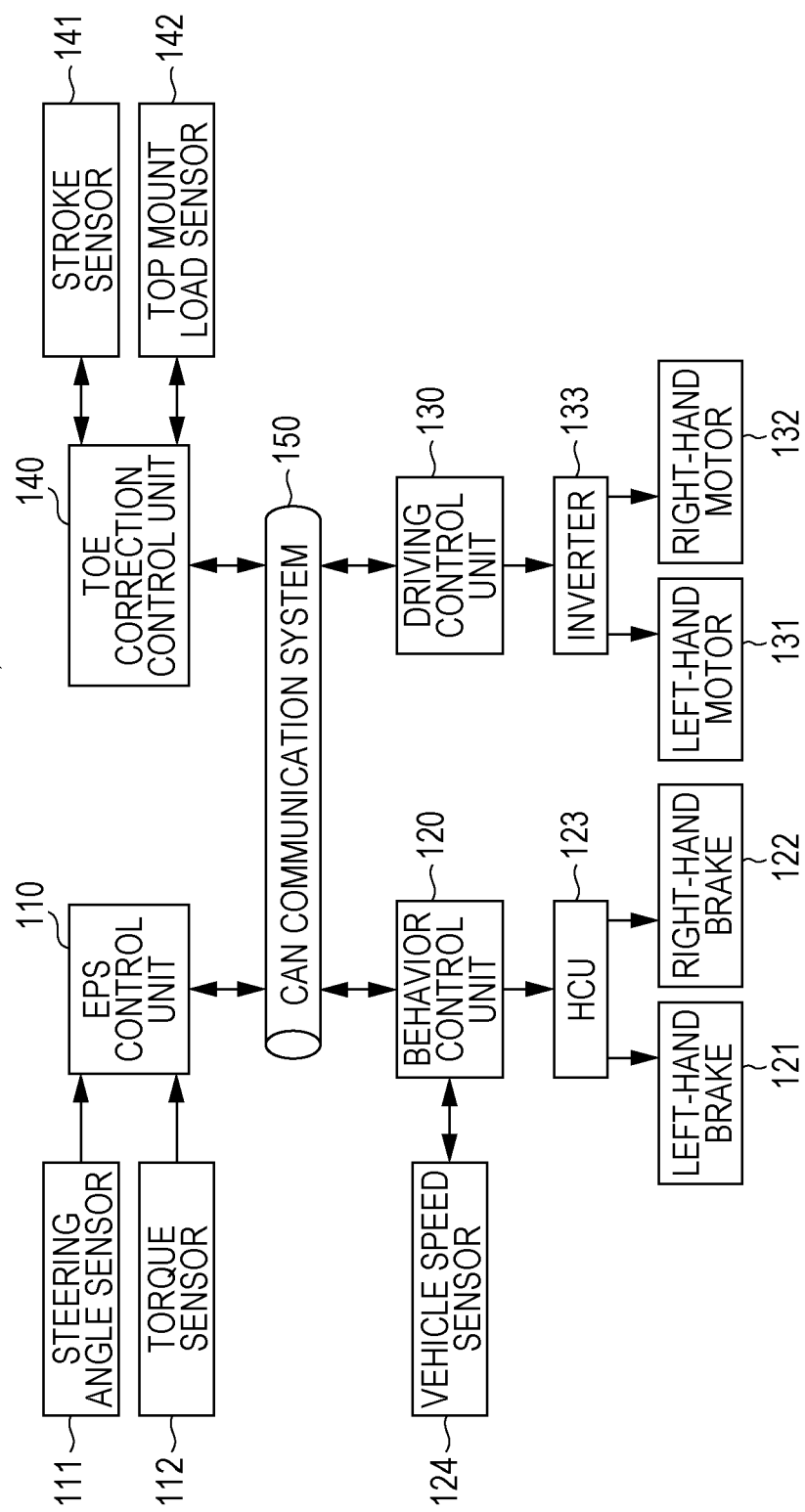
FIG. 8 is a block diagram illustrating a configuration of a control system of the suspension device according to the first implementation.

FIG. 8 is a block diagram illustrating a configuration of a control system 100 of the suspension device according to the first implementation. The suspension control system 100 includes an electric power steering (EPS) control unit 110, a behavior control unit 120, a driving control unit 130, a toe correction control unit 140, and so forth. These are mutually communicable via a CAN communication system 150 which is one type of in-vehicle LAN, for example.

The EPS control unit 110 controls an electric power steering device configured to generate steering assist torque according to input torque from a driver. The EPS control unit 110 is connected with a steering angle sensor 111 and a torque sensor 112. The steering angle sensor 111 is for detecting the current steering angle (steering wheel angle) of a steering system. The torque sensor 112 is for detecting input torque input from the steering system from the driver.

The behavior control unit 120 is for generating, in the case that a behavior such as over steer or under steer or the like occurs on the vehicle, braking force difference between left and right wheels to generate a moment in a direction where such a behavior is suppressed. The behavior control unit 120 controls a hydraulic control unit (HCU) 123 which can individually control brake fluid pressure to be supplied to a left-hand brake 121 and a right-hand brake 122. Also, the behavior control unit 120 is connected to a vehicle speed sensor 124 configured to output a pulse signal according to the rotational speed of the wheels, which enables vehicle speed to be obtained.

The driving control unit 130 is for performing driving control for applying driving force to both rear wheels using an independent motor. The driving control unit 130 may individually control driving force of both rear wheels by controlling an inverter 133 configured to individually supply driving power to a left-hand motor 131 and a right-hand motor 132. The left-hand motor 131 and right-hand motor 132 are, for example, in-wheel motors provided to the hub portions of both rear wheels respectively, but are not restricted to this, and an arrangement may be made in which both rear wheels are driven via the drive shaft from the sub frame 10.

The toe correction control unit 140 is for performing, in the case that start of turning has been detected with information from the EPS control unit 110 or the like, the above-described toe correction control for temporarily generating toe change in a direction where longitudinal force compliance steer is suppressed or cancelled out. The toe correction control unit 140 is connected with a stroke sensor 141 and a top mount load sensor 142. The stroke sensor 141 is for detecting the strokes of each damper of the left and right damper units 70. The top mount load sensor 142 is for detecting each load in the longitudinal direction applied to the top mount provided to the upper end portions of the left and right damper units 70.

Figure 9:
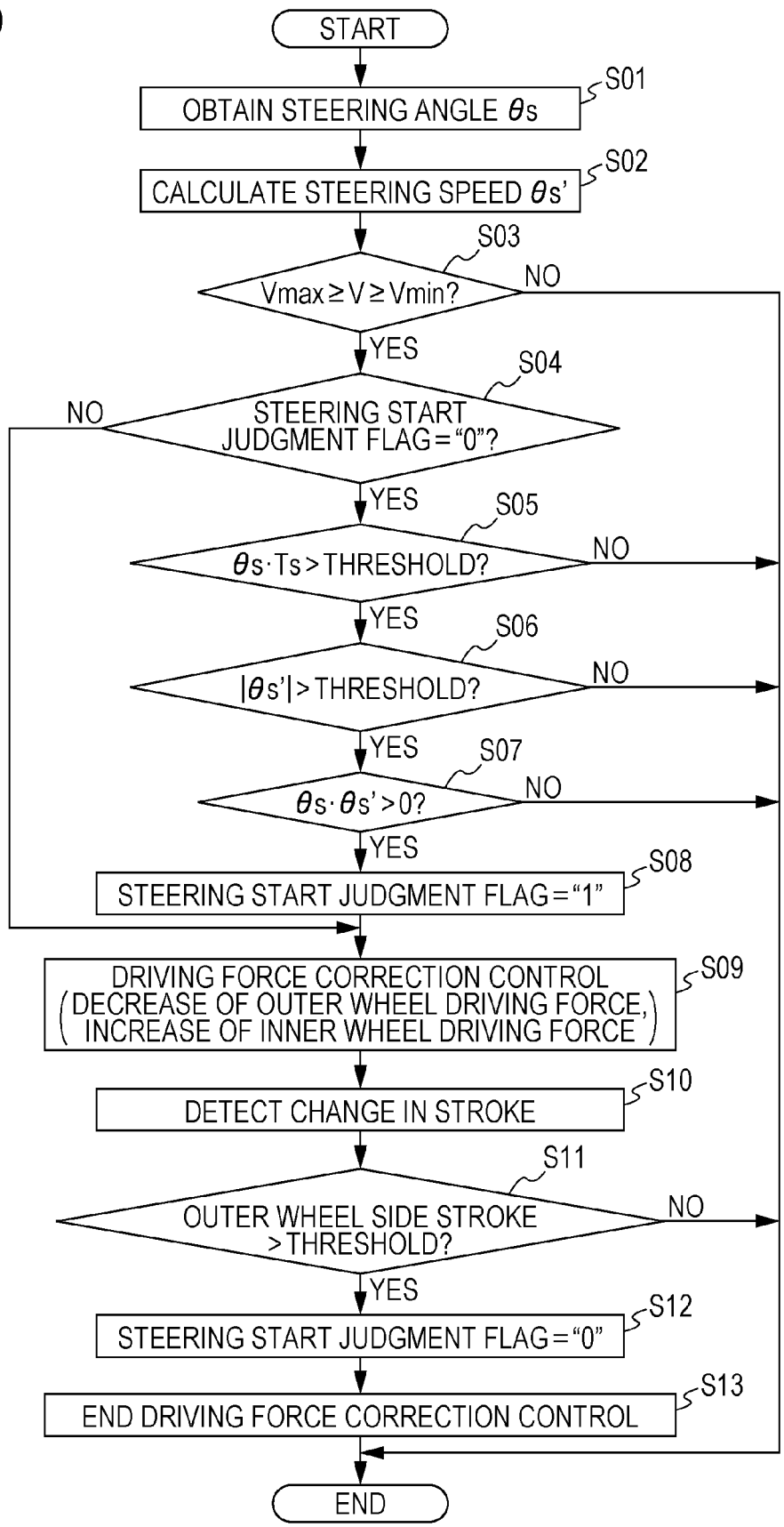
FIG. 9 is a flowchart illustrating toe angle correction control of the suspension device according to the first implementation.

FIG. 9 is a flowchart illustrating the toe angle correction control of the suspension device according to the first implementation. Hereinafter, description will be made sequentially for each step.

Step S01: Obtain Steering Wheel Angle θs

The toe correction control unit 140 obtains a steering wheel angle θs from the EPS control unit 110, and proceeds to step S02.

Step S02: Calculate Steering Speed θs'

The toe correction control unit 140 calculates steering speed θs' by performing temporal differentiation on the steering wheel angle θs obtained in step S01, and proceeds to step S03.

Step S03: Determine Vehicle Speed

The toe correction control unit 140 obtains vehicle speed V from the behavior control unit 120. Next, in the case that the current vehicle speed V is between the upper limit vehicle speed Vmax and the lower limit vehicle speed Vmin, which are set beforehand, the toe correction control unit 140 determines that the current vehicle speed V is in a vehicle speed range in which toe correction control has to be executed, and proceeds to step S04. In other cases, the toe correction control unit 140 determines that the current vehicle speed V is in a vehicle speed range in which toe correction control does not have to be executed, and terminates the series of processing (returns to the main routine).

Step S04: Determine Steering Start Judgment Flag

In the case that the flag value of a steering start judgment flag is 0, the toe correction control unit 140 proceeds to step S05 for determining whether or not steering has been started. In the case that the flag value of the steering start judgment flag is 1, the toe correction control unit 140 determines that steering has already been started, and proceeds to step S09.

Step S05: Determine Disturbance

In the case that product of the steering wheel angle θs obtained in step S01 and driver input torque Ts obtained from the EPS control unit 110 is equal to or greater than a predetermined threshold, the toe correction control unit 140 determines that an intentional steering operation by the driver has been performed, and proceeds to step S06. In other cases, the toe correction control unit 140 determines that there is change in the steering wheel angle θs or the like, which is caused from disturbance, and terminates the series of processing (returns to the main routine).

Step S06: Determine Steering Speed Absolute Value

The toe correction control unit 140 compares the absolute value of the steering speed θs' calculated in step S02 and a predetermined threshold. In the case that the absolute value of the steering speed θs' is equal to or greater than the threshold, the toe correction control unit 140 proceeds to step S07, and in other cases, terminates the series of processing (returns to the main routine).

Step S07: Determine Increasing Steering/Returning Steering

In the case that product of the steering wheel angle θs obtained in step S01 and the steering speed θs' calculated in step S02 is positive (greater than 0), the toe correction control unit 140 determines that the current state is a state in which the steering angle is being increased by the driver's operation, and proceeds to step S08. On the other hand, in other cases, the toe correction control unit 140 determines that the current state is a state in which the steering angle is being decreased by the driver's operation, and terminates the series of processing (returns to the main routine).

Step S08: Set Steering Start Judgment Flag

The toe correction control unit 140 sets the flag value of the steering start judgment flag from 0 to 1, and proceeds to step S09.

Step S09: Driving Force Correction Control

The toe correction control unit 140 outputs a command to the driving control unit 130 to perform driving force correction control. The driving force correction control increases the driving force of the turning outer wheel to steer the turning outer wheel in the toe-in direction using the toe-out properties due to the tie rods being situated behind the wheel center, and also to decrease the driving force of the turning inner while to steer the turning inner in the toe-in direction. Thereafter, the toe correction control unit 140 proceeds to step S10.

Step S10: Detect Change in Stroke

The toe correction control unit 140 detects the strokes of the left and right damper units 70 using the stroke sensor 141, and proceeds to step S11.

Step S11: Determine Outer Wheel Side Stroke

In the case that the stroke change amount since the time of straight advance of the damper unit 70 on the turning outer wheel side is equal to or greater than a predetermined threshold, the toe correction control unit 140 determines that, according to lateral force compliance steer properties and bump steer properties, toe change to the toe-in side at the outer wheel, and toe change to the toe-out side at the inner wheel are sufficiently occurring, and proceeds to step S12. In other cases, the toe correction control unit 140 determines that continuation of the toe correction control is needed, and terminates the series of processing (returns to the main routine).

Step S12: Clear Steering Start Judgment Flag

The toe correction control unit 140 clears the flag value of the steering start judgment flag to 0, and proceeds to step S13.

Step S13: End Driving Force Correction Control

The toe correction control unit 140 terminates the driving force correction control, and terminates the series of processing (returns to the main routine).

Figure 10:
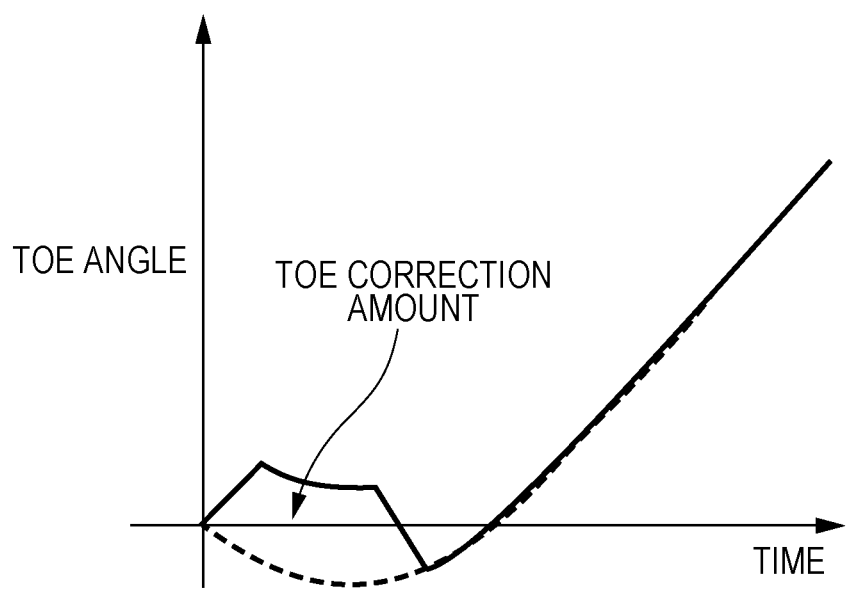
FIG. 10 is a graph schematically illustrating a transition example of a rear wheel toe angle in the suspension device according to the first implementation.

FIG. 10 is a graph schematically illustrating a transition example of a rear wheel toe angle in the suspension device 1 according to the first implementation. The vertical axis illustrates the toe angle of the turning outer wheel, and the upward illustrates the toe-in side. The lateral axis illustrates time from start of steering. Also, a history in the case of having performed no driving force correction control is illustrated by a dashed line, and a history in the case of having performed the driving force correction control is illustrated by a solid line. Note that, though toe-in and toe-out are inverted at the turning inner wheel side as well, essentially the same histories are illustrated.

In the case of having performed no driving force correction control, upon the toe angle of the rear wheel being first changed to the toe-out direction by the longitudinal force compliance steer properties, and either one of stroke change and lateral force of the suspension occurring, the toe angle of the rear wheel is changed to the toe-in side by the bump steer properties and lateral force compliance steer properties. On the other hand, according to the first implementation, toe change to the toe-in side can temporarily be generated at the initial stage of turning by the above-described driving force correction control, and steering stability can be improved, temporarily preventing the turning outer wheel from being steered to the toe-out side. Also, similarly, the turning inner wheel side can temporarily be prevented from being steered to the toe-in side before being steered to the toe-out side.

Second Implementation

Next, a suspension device to which a second implementation of the present invention has been applied will be described. In the following implementation s to be described, portions substantially the same as with the first implementation will be denoted with the same reference numerals, description thereof will be omitted, and different points will principally be described. Though the suspension device according to the second implementation cancels influence of longitudinal force compliance steer by driving force correction control of both rear wheels, in the same way as with the first implementation, the driving force correction amount is set according to the top mount load to suppress sudden toe change due to on/off of the driving force control, and also gradually changes the driving force correction amount at the time of ending the correction.

Figure 11:
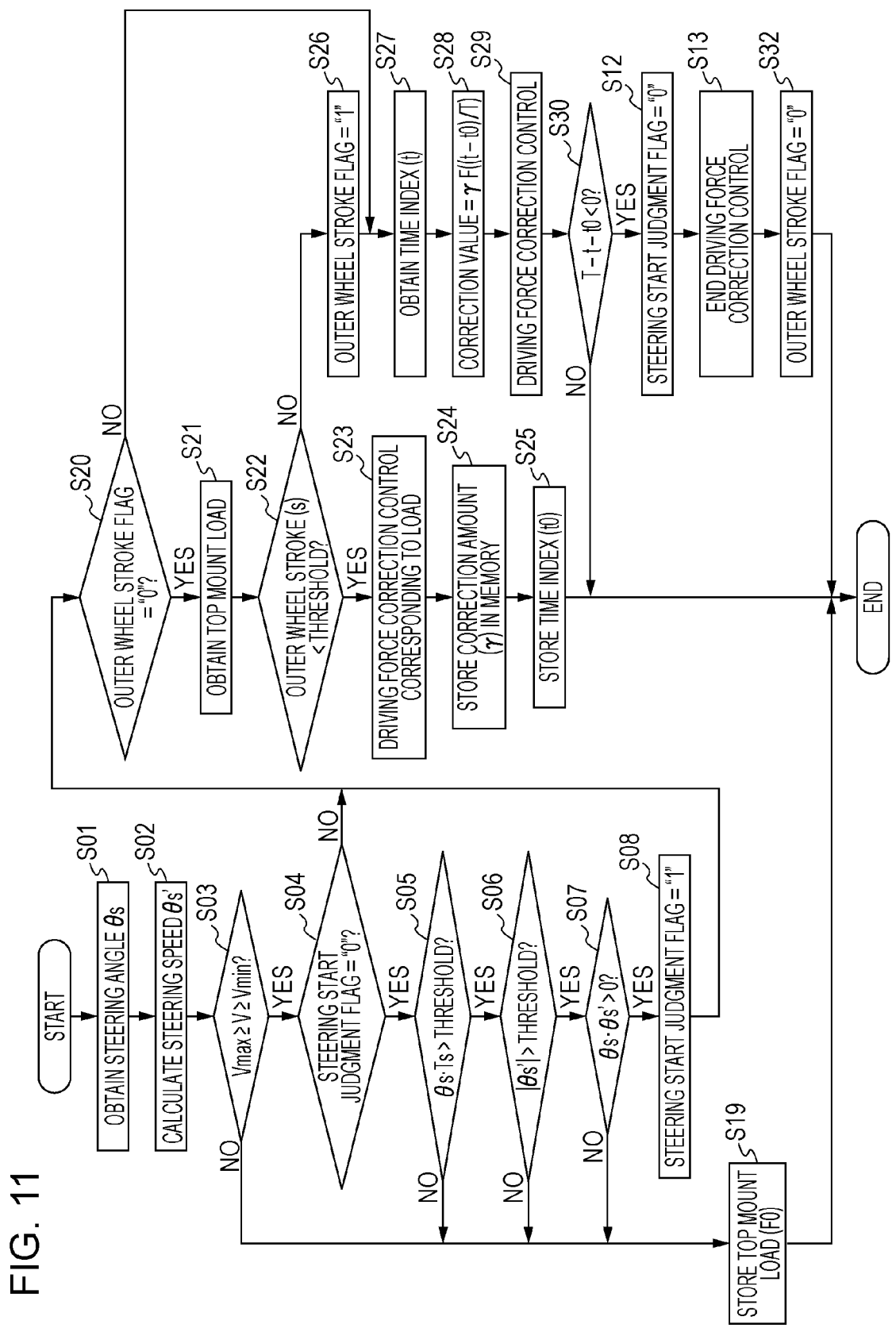
FIG. 11 is a flowchart illustrating toe angle correction control of a suspension device to which a second implementation of the present invention has been applied.

FIG. 11 is a flowchart illustrating toe angle correction control of the suspension device according to the second implementation. Hereinafter, description will be made sequentially for each step.

Step S01: Obtain Steering Wheel Angle θs

The toe correction control unit 140 obtains a steering wheel angle θs from the EPS control unit 110, and proceeds to step S02.

Step S02: Calculate Steering Speed θs'

The toe correction control unit 140 calculates steering speed θs' by performing temporal differentiation on the steering wheel angle θs obtained in step S01, and proceeds to step S03.

Step S03: Determine Vehicle Speed

The toe correction control unit 140 obtains vehicle speed V from the behavior control unit 120. Next, in the case that the current vehicle speed V is between the upper limit vehicle speed Vmax and the lower limit vehicle speed Vmin, which are set beforehand, the toe correction control unit 140 determines that the current vehicle speed V is in a vehicle speed range in which toe correction control has to be executed, and proceeds to step S04. In other cases, the toe correction control unit 140 determines that the current vehicle speed V is in a vehicle speed range in which toe correction control does not have to be executed, and proceeds to step S19.

Step S04: Determine Steering Start Judgment Flag

In the case that the flag value of a steering start judgment flag is 0, the toe correction control unit 140 proceeds to step S05 for determining whether or not steering has been started. In the case that the flag value of the steering start judgment flag is 1, the toe correction control unit 140 determines that steering has already been started, and proceeds to step S20.

Step S05: Determine Disturbance

In the case that product of the steering wheel angle θs obtained in step S01 and driver input torque Ts obtained from the EPS control unit 110 is equal to or greater than a predetermined threshold, the toe correction control unit 140 determines that an intentional steering operation by the driver has been performed, and proceeds to step S06. In other cases, the toe correction control unit 140 determines that there is change in the steering wheel angle θs or the like, which is caused from disturbance, and proceeds to step S19.

Step S06: Determine Steering Speed Absolute Value

The toe correction control unit 140 compares the absolute value of the steering speed θs' calculated in step S02 and a predetermined threshold. In the case that the absolute value of the steering speed θs' is equal to or greater than the threshold, the toe correction control unit 140 proceeds to step S07, and in other cases, proceeds to step S19.

Step S07: Determine Increasing Steering/Returning Steering

In the case that product of the steering wheel angle θs obtained in step S01 and the steering speed θs' calculated in step S02 is positive (greater than 0), the toe correction control unit 140 determines that the current state is a state in which the steering angle is being increased by the driver's operation, and proceeds to step S08. On the other hand, in other cases, the toe correction control unit 140 determines that the current state is a state in which the steering angle is being decreased by the driver's operation, and proceeds to step S19.

Step S08: Set Steering Start Judgment Flag

The toe correction control unit 140 sets the flag value of the steering start judgment flag from 0 to 1, and proceeds to step S20.

Step S19: Store Top Mount Load

The toe correction control unit 140 stores the current top mount load (F0) detected by the top mount load sensor 142, and terminates the series of processing (returns to the main routine).

Step S20: Determine Outer Wheel Stroke Flag

In the case that the flag value of an outer wheel stroke flag which is a flag indicating whether or not there is stroking of the damper unit 70 on the outer wheel side is 0, the toe correction control unit 140 proceeds to step S21, and in other cases, proceeds to step S27.

Step S21: Obtain Top Mount Load

The toe correction control unit 140 obtains the current top mount load of the damper unit 70 on the outer wheel side from the top mount load sensor 142, and proceeds to step S22.

Step S22: Determine Outer Wheel Stroke

In the case that the stroke change amount from the straight advance state on the outer wheel side detected by the stroke sensor 141 is smaller than a predetermined threshold, the toe correction control unit 140 determines that the toe correction control is needed, and proceeds to step S23, and in other cases, proceeds to step S26 for ending the toe correction control.

Step S23: Driving Force Correction Control

Figure 12:
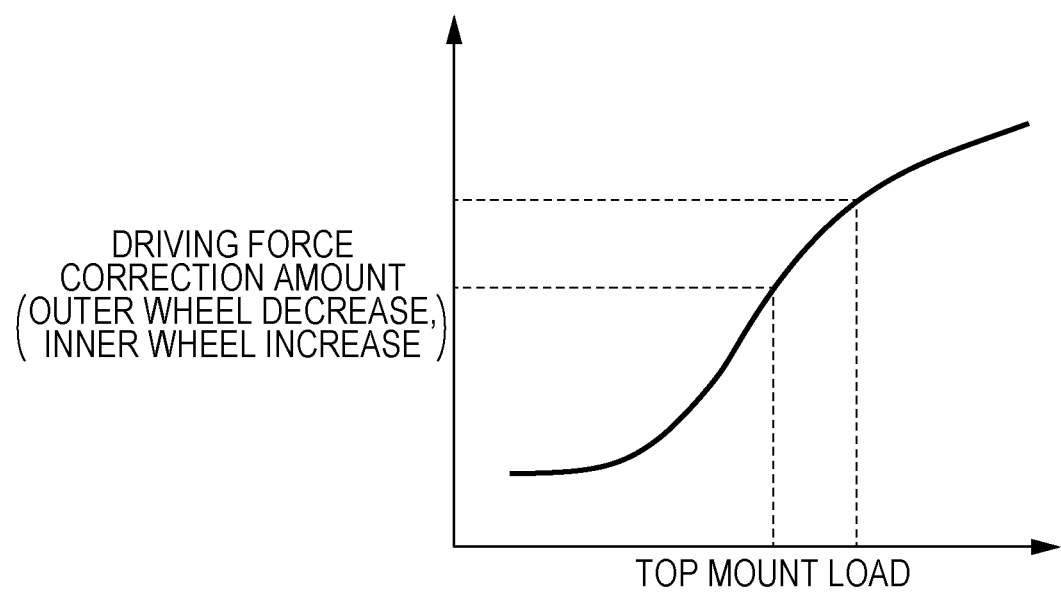
FIG. 12 is a graph illustrating a correlation between top mount load and driving force correction amount in the suspension device according to the second implementation.

The toe correction control unit 140 outputs a command to the driving control unit 130 to perform driving force correction control. The driving force correction control is to increase the driving force of the turning outer wheel to steer the turning outer wheel in the toe-in direction with the toe-out properties due to the tie rods being situated behind the wheel center, and also to decrease the driving force of the turning inner while to steer the turning inner while in the toe-out direction. Driving force decreasing amount on the outer wheel side and driving force increasing amount on the inner wheel side at this time change according to the top mount load. FIG. 12 is a graph illustrating a correlation between the top mount load and driving force correction amount in the suspension device according to the second implementation. As illustrated in FIG. 12, the driving force correction amount is set so as to be increased according to increase in the top mount load. Thereafter, the toe correction control unit 140 proceeds to step S24.

Step S24: Store Correction Amount

The toe correction control unit 140 stores correction amount γ according to the driving force correction being executed now, and proceeds to step S25.

Step S25: Store Time Index

The toe correction control unit 140 stores the current point-in-time as a time index t0, and terminates the series of processing (returns to the main routine).

Step S26: Set Outer Wheel Stroke Flag

The toe correction control unit 140 sets the flag value of an outer wheel stroke flag to 1, and proceeds to step S27.

Step S27: Obtain Time Index

The toe correction control unit 140 obtains the current point-in-time as a time index t, and proceeds to step S28.

Step S28: Calculate Correction Value

The toe correction control unit 140 calculates correction amount (outer wheel driving force decreasing amount/inner wheel driving force increasing amount) of driving force correction using the following Expression (1).

$$\text{Correction value} = \gamma F((t-t0)/T) \quad (1)$$

Figure 13:
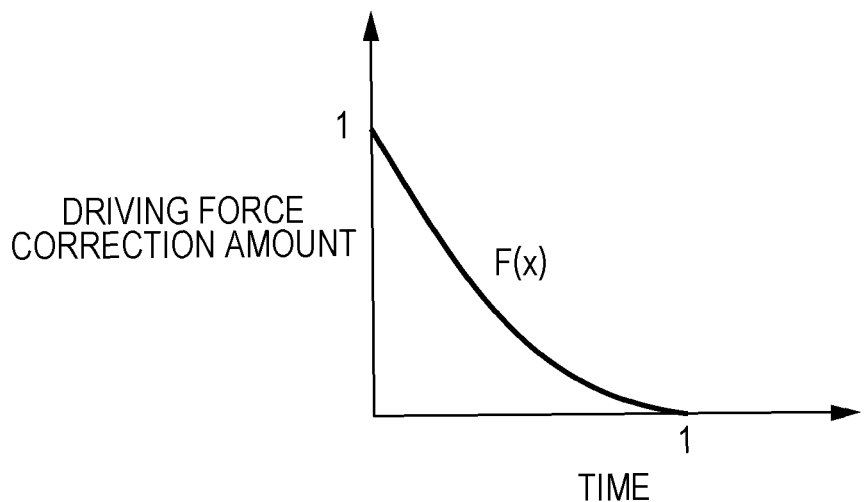
FIG. 13 is a graph illustrating a transition of driving force correction amount at the time of ending driving force correction normalized in the suspension device according to the second implementation.

Here, F(x) is a function to be set for gradually decreasing correction amount. FIG. 13 is a graph illustrating a transition of driving force correction amount at the time of ending of driving force correction normalized in the suspension device according to the second implementation. As illustrated in FIG. 13, the function F(x) is for gradually changing the normalized correction amount from 1 to 0 according to elapse of normalized time (0 to 1). Also, T indicates time until the correction amount to be gradually decreased finally reaches 0. Thereafter, the toe correction control unit 140 proceeds to step S29.

Step S29: Driving Force Correction

The toe correction control unit 140 corrects the driving force of both rear wheels using the driving force correction amount calculated in step S19, and proceeds to S30.

Step S30: Determine Correction End Time

The toe correction control unit 140 determines whether or not driving force correction has been substantially terminated using the following Expression (2).

$$T - t - t0 < 0 \quad (2)$$

In the case that Expression (2) is satisfied, the toe correction control unit 140 determines that driving force correction has been substantially terminated, and terminates the series of processing (returns to the main routine). On the other hand, in the case that Expression (2) is not satisfied, the toe correction control unit 140 proceeds to step S12.

Step S12: Clear Steering Start Judgment Flag

The toe correction control unit 140 clears the flag value of the steering start judgment flag to 0, and proceeds to step S13.

Step S13: End Driving Force Correction Control

The toe correction control unit 140 terminates the driving force correction control, and proceeds to step S32.

Step S32: Clear Outer Wheel Stroke Flag

The toe correction control unit 140 clears the flag value of the outer wheel stroke flag to 0, and terminates the series of processing (returns to the main routine).

Figure 14:
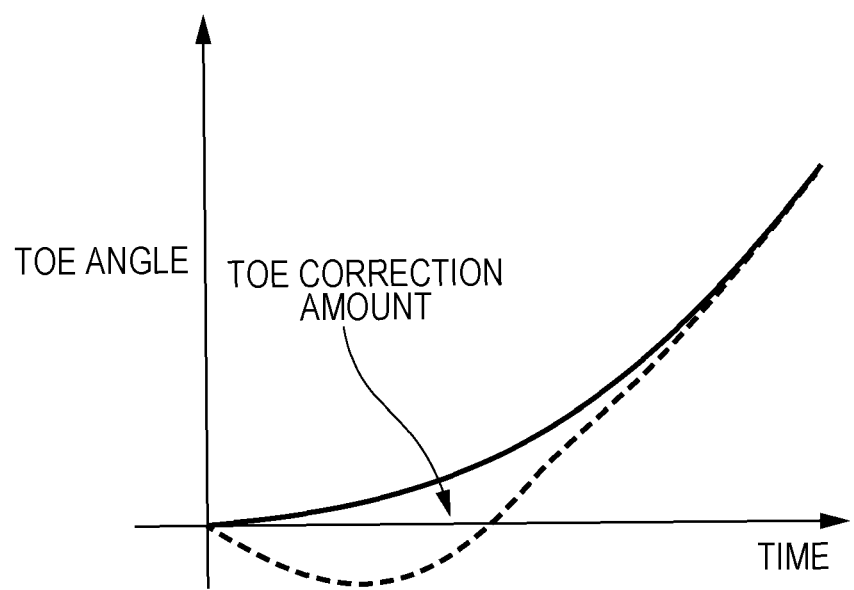
FIG. 14 is a graph schematically illustrating a transition example of a rear wheel toe angle in the suspension device according to the second implementation.

FIG. 14 is a graph schematically illustrating a transition example of a rear wheel toe angle in the suspension device according to the second implementation. According to the second implementation, change in the toe angle is made moderate by setting the correction amount in the driving force correction so as to be increased according to the top mount load, and also gradually decreasing the correction amount at the time of ending correction, whereby steering stability can be improved, and also uncomfortable feeling of the driver can be reduced.

Third Implementation

Figure 15:
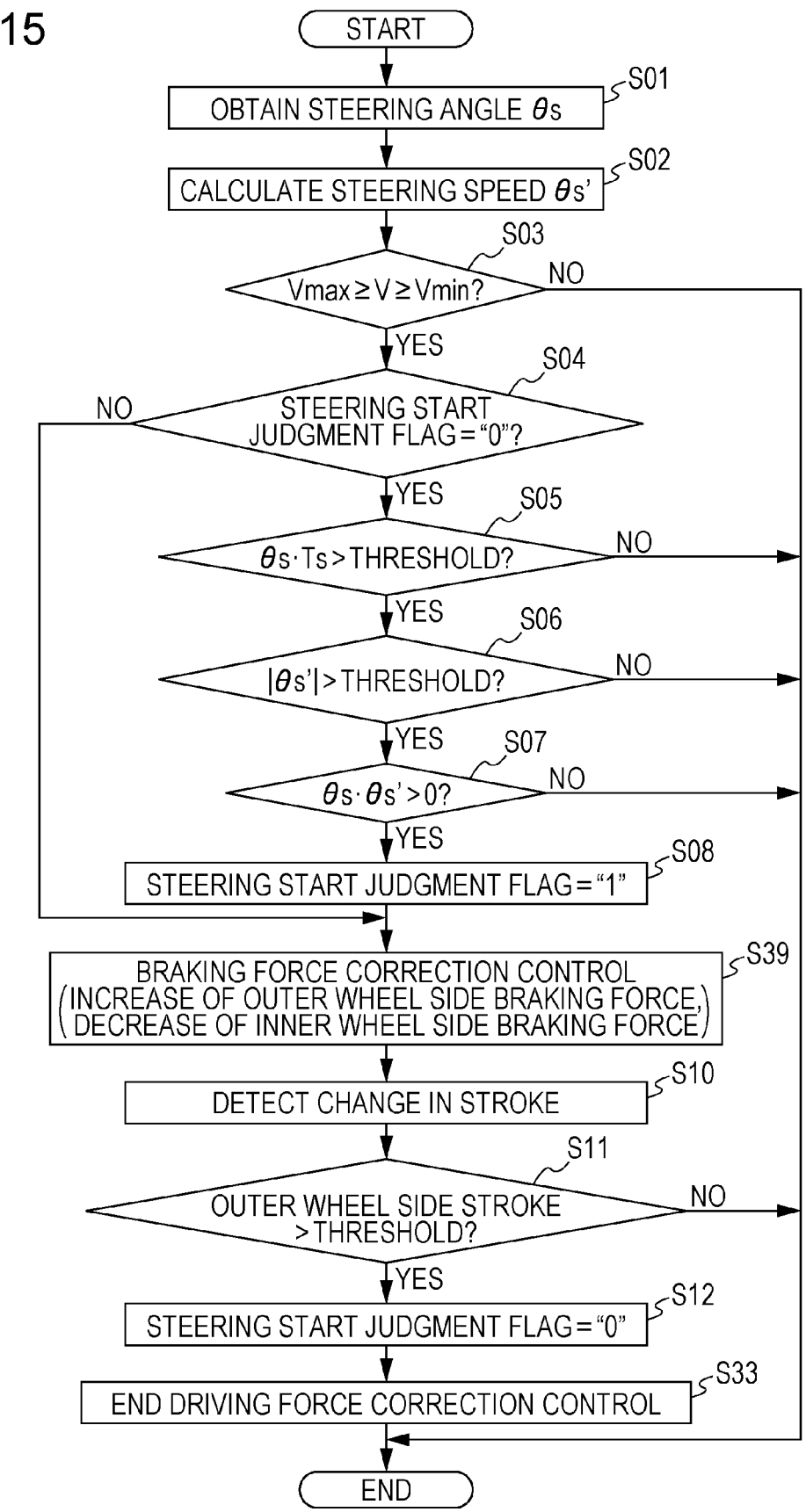
FIG. 15 is a flowchart illustrating toe angle correction control of a suspension device to which a third implementation of the present invention has been applied.

Next, a suspension device to which a third implementation of the present invention has been applied will be described. The suspension device according to the third implementation is for cancelling influence of longitudinal force compliance steer at the initial stage of turning using braking force difference between both rear wheels instead of the driving force difference between both rear wheels according to the first implementation. Such braking force difference can be generated using the behavior control unit 120 and HCU 123. FIG. 15 is a flowchart illustrating toe angle correction control of the suspension device according to the third implementation.

As illustrated in FIG. 15, control according to the third implementation differs from the control according to the first implementation illustrated in FIG. 9 in that, in step S39, braking force of the outer wheel is increased (braking force is generated in the case of no braking being applied), and also braking force correction control for decreasing braking force of the inner wheel (without correction in the case of no braking being applied) is performed, and in that this braking force correction control is terminated in step S33.

According to the above-described third implementation as well, substantially the same advantage as the advantage of the above-described first implementation can be obtained. Note that the third implementation may be modified such that the braking force correction amount is set so as to be increased according to the top mount load in substantially the same way as with the driving force correction amount according to the second implementation, and also the braking force correction amount is gradually changed at the time of ending of the braking force correction. In this case, substantially the same advantage as the advantage of the second implementation can be obtained.

Fourth Implementation

Figure 16:
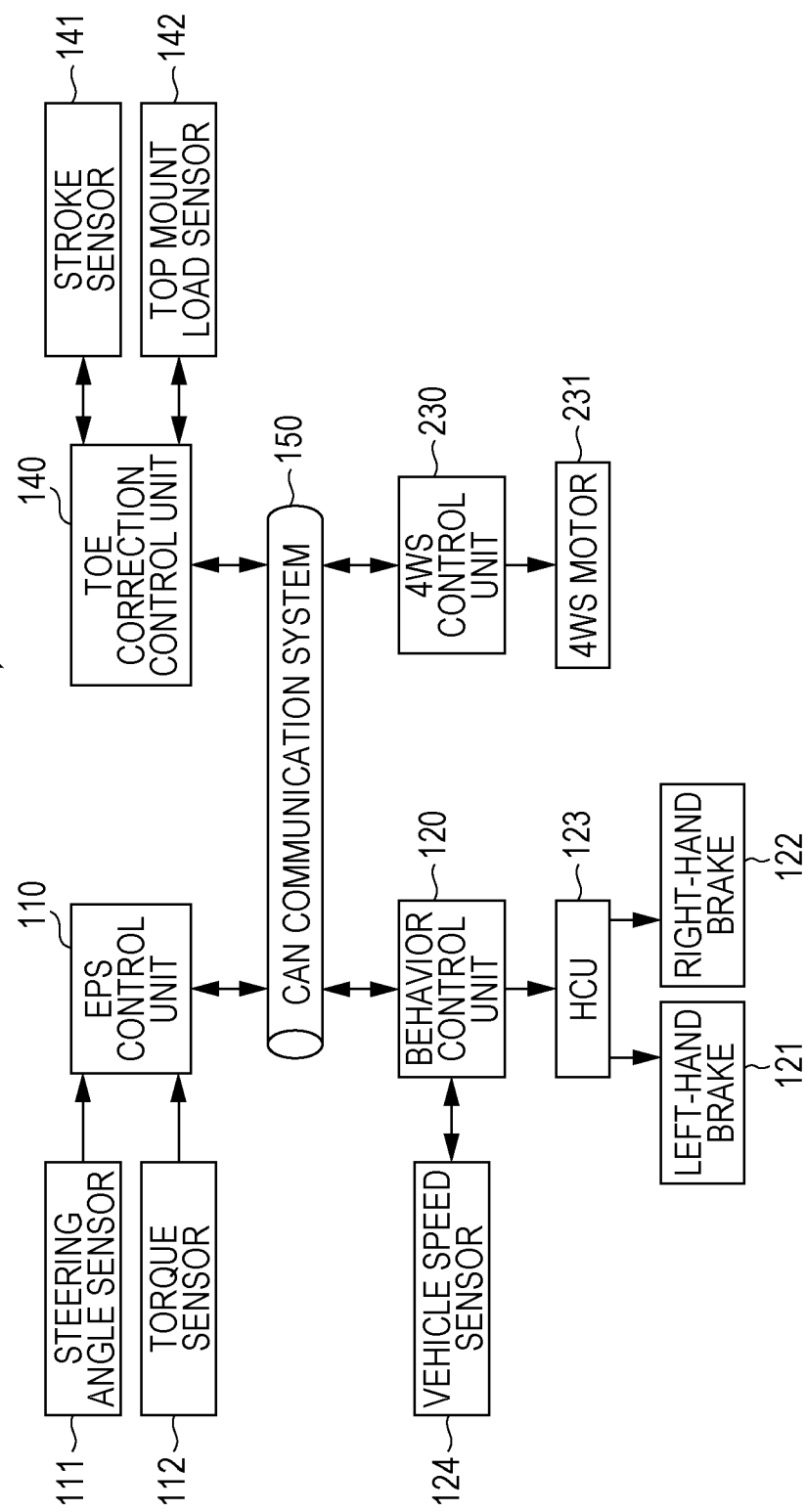
FIG. 16 is a block diagram illustrating a configuration of a control system of a suspension device to which a fourth implementation of the present invention has been applied.

Next, a suspension device to which a fourth implementation of the present invention has been applied will be described. The suspension device according to the fourth implementation is for cancelling influence of longitudinal force compliance steer at the initial stage of turning using a four-wheel steering (4WS) system for steering rear wheels using an actuator. FIG. 16 is a block diagram illustrating a configuration of a control system of the suspension device according to the fourth implementation. The suspension control system according to the fourth implementation includes a 4WS control unit 230 instead of the driving control unit 130 according to the first implementation, and so forth. The 4WS control unit 230 is for controlling a 4WS motor 231 which is an electric actuator configured to forcibly change (steer) the toe angles of both rear wheels.

Figure 17:
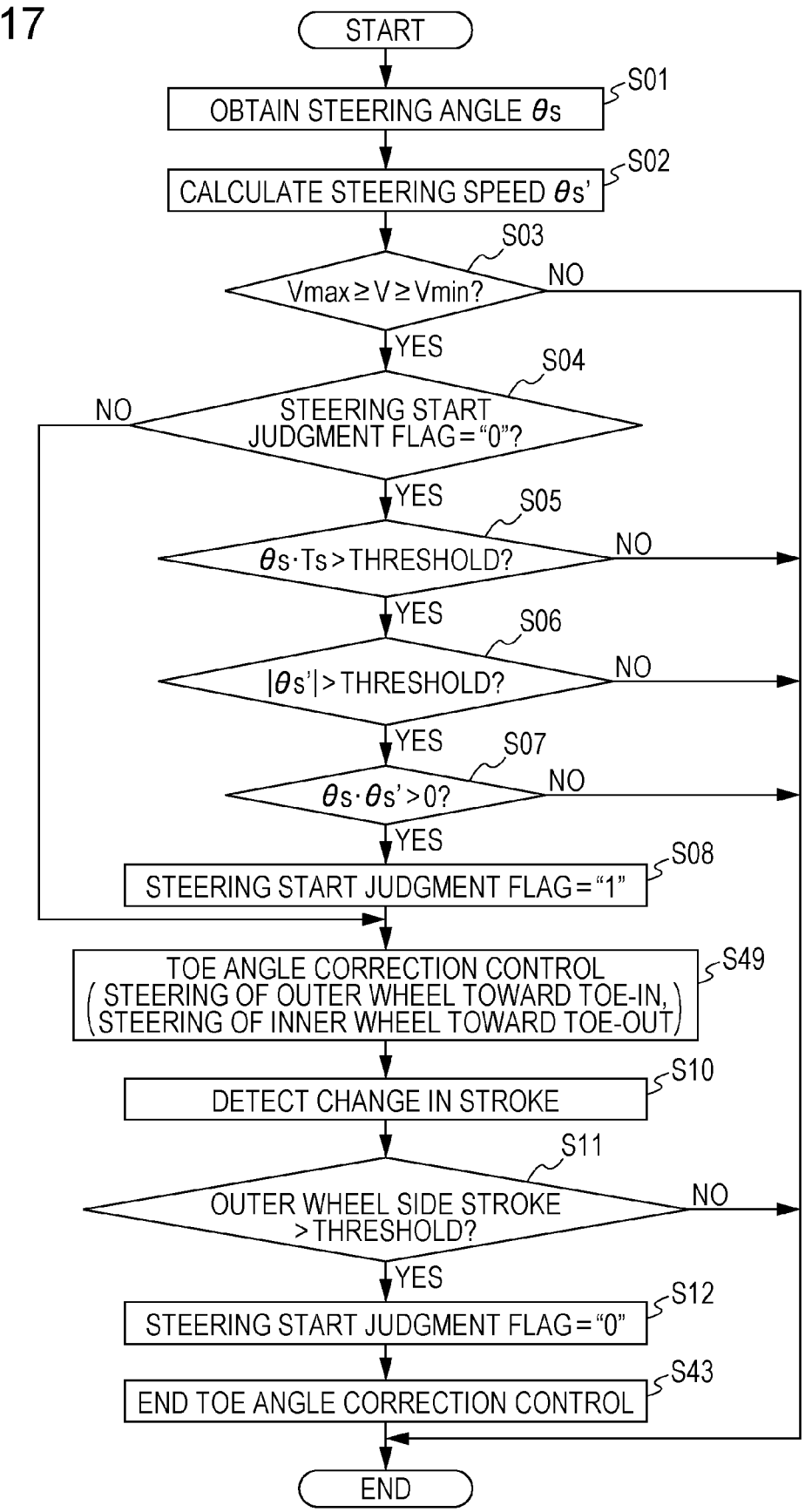
FIG. 17 is a flowchart illustrating toe angle correction control of the suspension device according to the fourth implementation.

FIG. 17 is a flowchart illustrating toe angle correction control of the suspension device according to the fourth implementation. As illustrated in FIG. 17, control according to the fourth implementation differs from the control according to the first implementation illustrated in FIG. 9 in that toe angle correction control for steering the outer wheel to the toe-in side and the inner wheel to the toe-out side is performed in step S49, and also this toe angle correction control is terminated in step S43.

According to the above-described fourth implementation, the toe angle correction control for steering the outer wheel to the toe-in side and the inner wheel to the toe-out side using the 4WS system at the initial stage of turning, whereby steering stability can be improved preventing the outer wheel from being steered to the toe-out side by longitudinal force compliance steer. Note that the fourth implementation may be modified such that the correction amount of a toe angle is set so as to be increased according to the top mount load in substantially the same way as with the driving force correction amount according to the second implementation, and also the toe angle correction amount is gradually changed at the time of ending of the toe angle correction. In this case, substantially the same advantage as the advantage of the second implementation can be obtained.

Fifth Implementation

Figure 18:
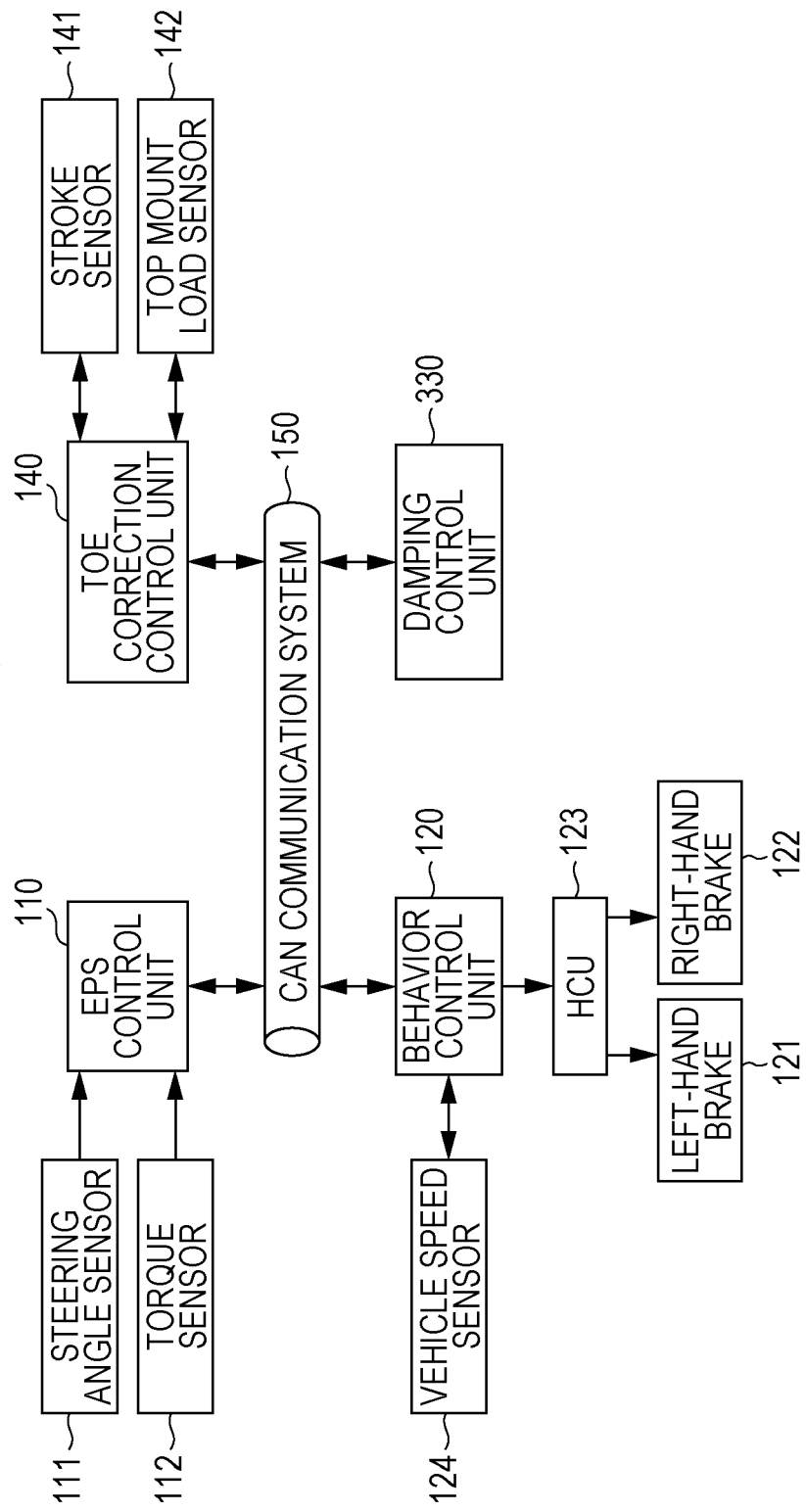
FIG. 18 is a block diagram illustrating a configuration of a control system of the suspension device to which a fifth implementation of the present invention has been applied.

Next, a suspension device to which a fifth implementation of the present invention has been applied will be described. The suspension device according to the fifth implementation is for cancelling influence of longitudinal force compliance steer at the initial stage of turning using a variable damper configured to take a magnetorheological (MR) fluid of which the viscoelastic properties are changed by externally applying a magnetic field thereto, as a working fluid. FIG. 18 is a block diagram illustrating a configuration of a control system of the suspension device according to the fifth implementation. The suspension control system according to the fifth implementation includes a damping control unit 330 instead of the driving control unit 130 according to the first implementation, and so forth. The damping control unit 330 is for changing damping properties by controlling a magnetic field applied to the dampers of the left and right damper units 70.

Figure 19:
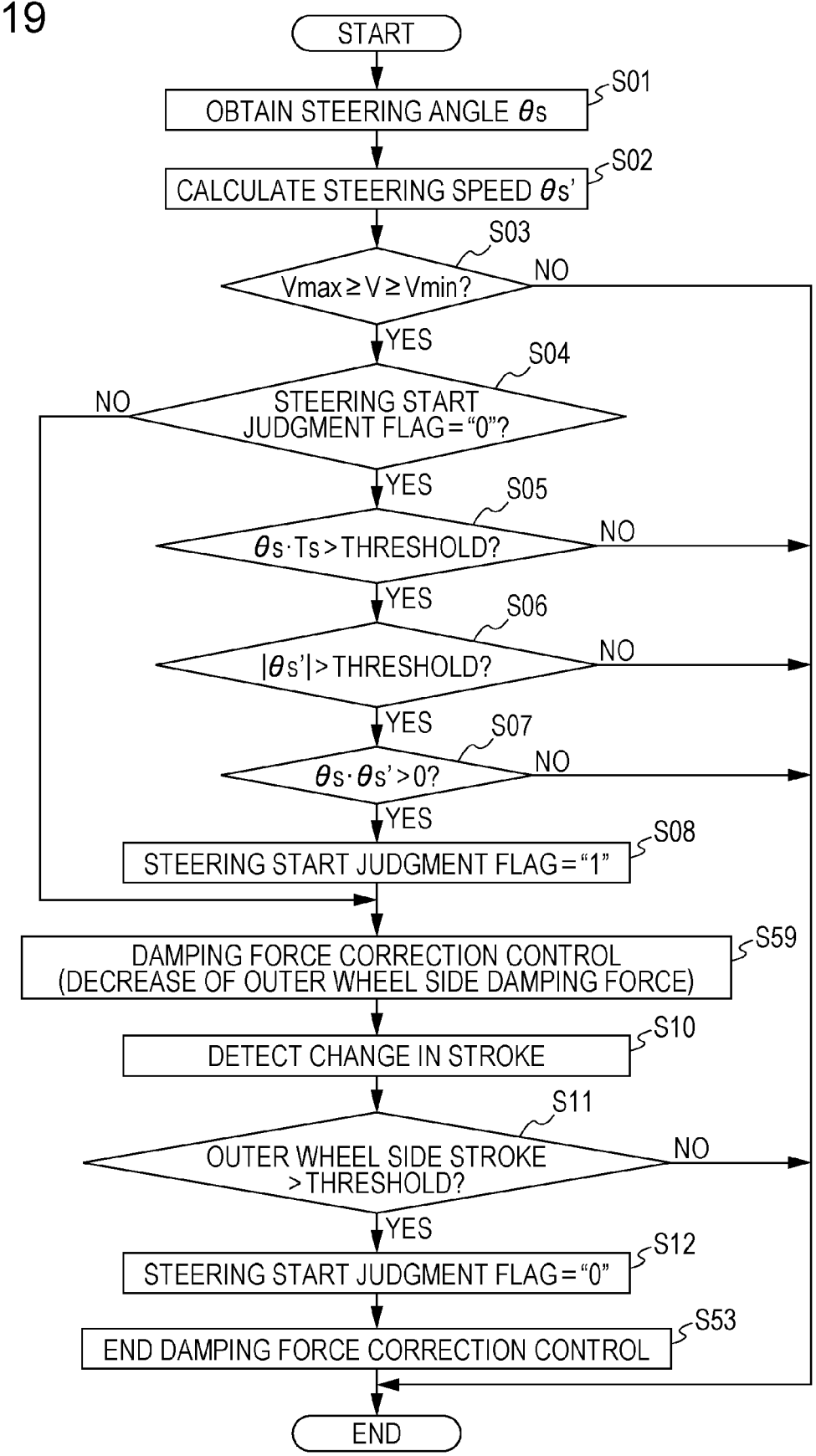
FIG. 19 is a flowchart illustrating toe angle correction control of the suspension device according to the fifth implementation.

FIG. 19 is a flowchart illustrating toe angle correction control of the suspension device according to the fifth implementation. As illustrated in FIG. 19, control according to the fifth implementation differs from the control according to the first implementation illustrated in FIG. 9 in that damping force correction control for decreasing damping force of the damper on the outer wheel side is performed in step S59, and also this damping force correction control is terminated in step S53.

Figure 20:
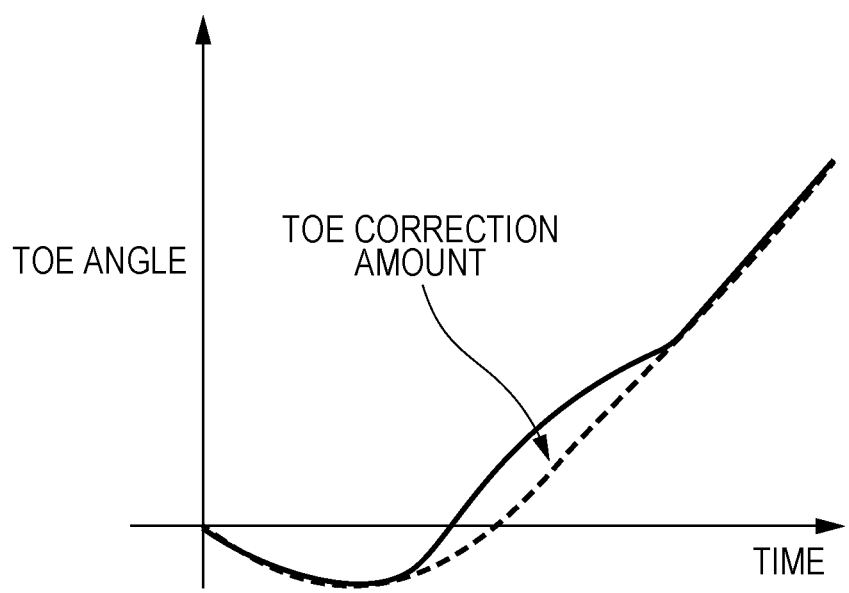
FIG. 20 is a graph schematically illustrating a transition example of a rear wheel toe angle in the suspension device according to the fifth implementation.

FIG. 20 is a graph schematically illustrating a transition example of a rear wheel toe angle in the suspension device according to the fifth implementation. In the case of having performed no damping force correction control, the rear wheel toe angle is first changed to the toe-out direction by the longitudinal force compliance steer properties, and thereafter, upon stroke change or lateral force of the suspension occurring, the rear wheel toe angle is changed to the toe-in side by the bump steer properties and lateral force compliance steer properties. In the case of having performed the damping force correction control, the damping force of the damper of the turning outer wheel is decreased to facilitate the initial stroking of the damper units 70, the bump steer properties are generated at an early stage to reduce the period during which influence of the longitudinal force compliance steer properties is manifested, whereby steering stability can be improved.

Sixth Implementation

Figure 21:
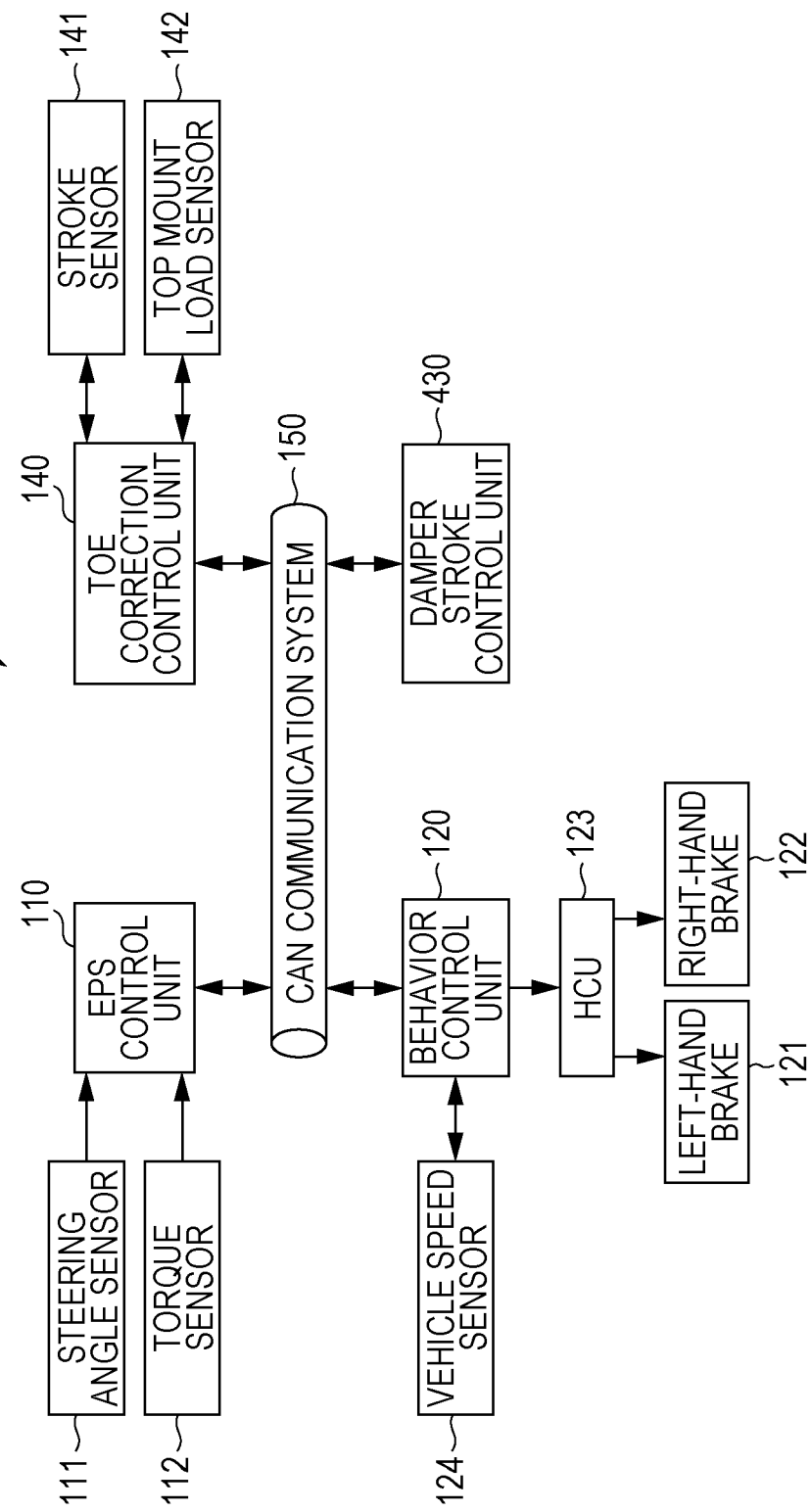
FIG. 21 is a block diagram illustrating a configuration of a control system of a suspension device to which a sixth implementation of the present invention has been applied.

Next, a suspension device to which a sixth implementation of the present invention has been applied will be described. The suspension device according to the sixth implementation is an active suspension which enables the damper stroke to be expanded or contracted forcibly, and is for cancelling influence of longitudinal force compliance steer at the initial stage of turning by control of the damper stroke. FIG. 21 is a block diagram illustrating a configuration of a control system of the suspension device according to the sixth implementation. The suspension control system according to the sixth implementation includes a damper stroke control unit 430 instead of the driving control unit 130 according to the first implementation, and so forth. The damper stroke control unit 430 controls an actuator configured to expand or contract the dampers of the left and right damper units 70 to control the stroking thereof.

Figure 22:
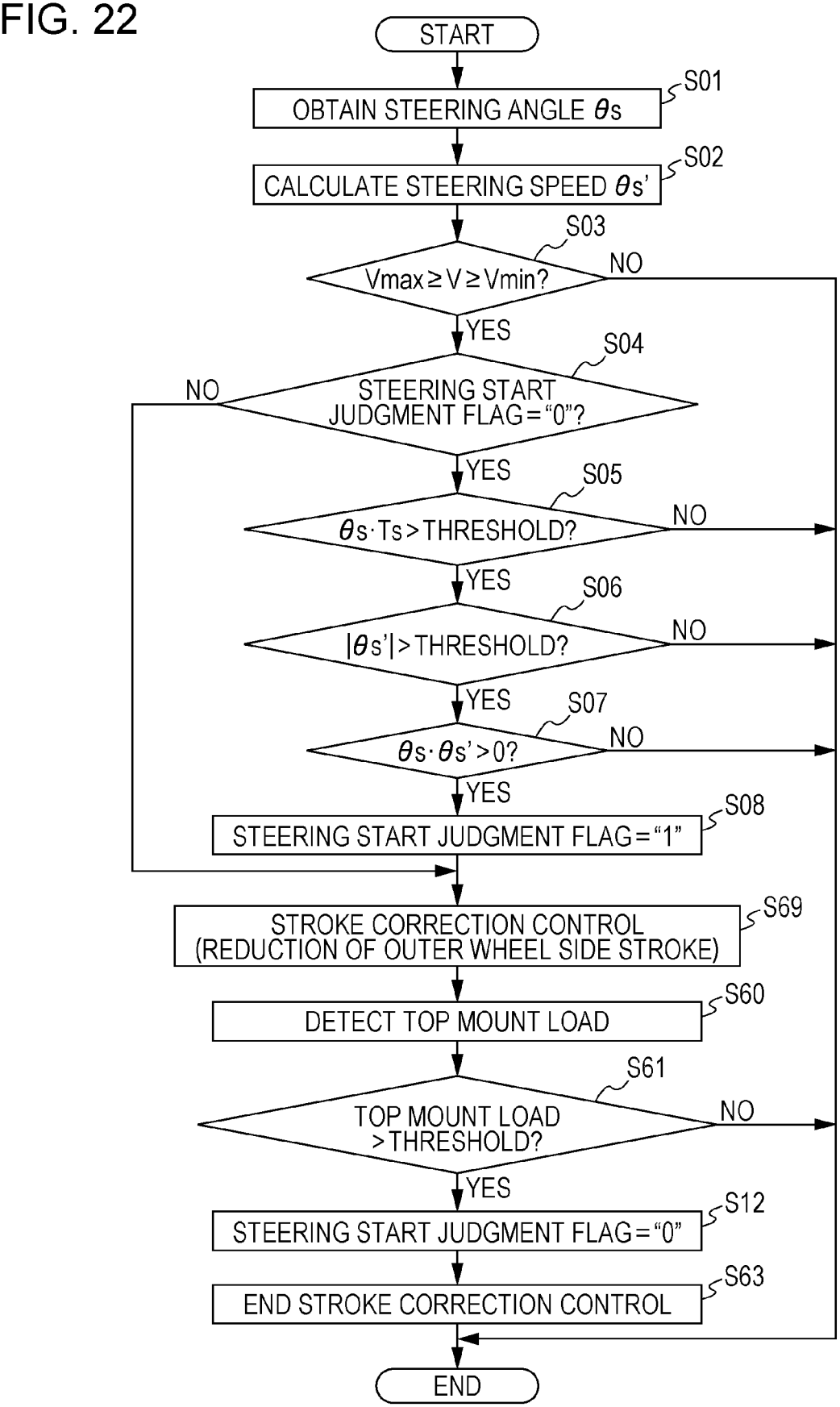
FIG. 22 is a flowchart illustrating toe angle correction control of the suspension device according to the sixth implementation.

FIG. 22 is a flowchart illustrating toe angle correction control of the suspension device according to the sixth implementation. As illustrated in FIG. 22, control according to the sixth implementation differs from the control according to the first implementation illustrated in FIG. 9 in that stroke correction control for reducing the stroke of the damper on the outer wheel side is performed in step S69, and also this stroke correction control is terminated in step S63. Also, the control according to the sixth implementation differs from the control according to the first implementation illustrated in FIG. 9 in that the top mount load of the damper units 70 is detected in step S60, and in step S61 the top mount load is compared with a threshold, and in the case that the top mount load is greater than the threshold, the toe correction control unit 140 proceeds to step S12, and in other cases, terminates the series of processing (returns to the main routine).

According to the above-described sixth implementation, the stroke of the damper on the outer wheel side is forcibly reduced at the initial stage of turning, whereby bump steer can be generated at an early stage, and steering stability can be improved preventing the outer wheel from being steered to the toe-out side by longitudinal force compliance steer.

Seventh Implementation

Figure 23:
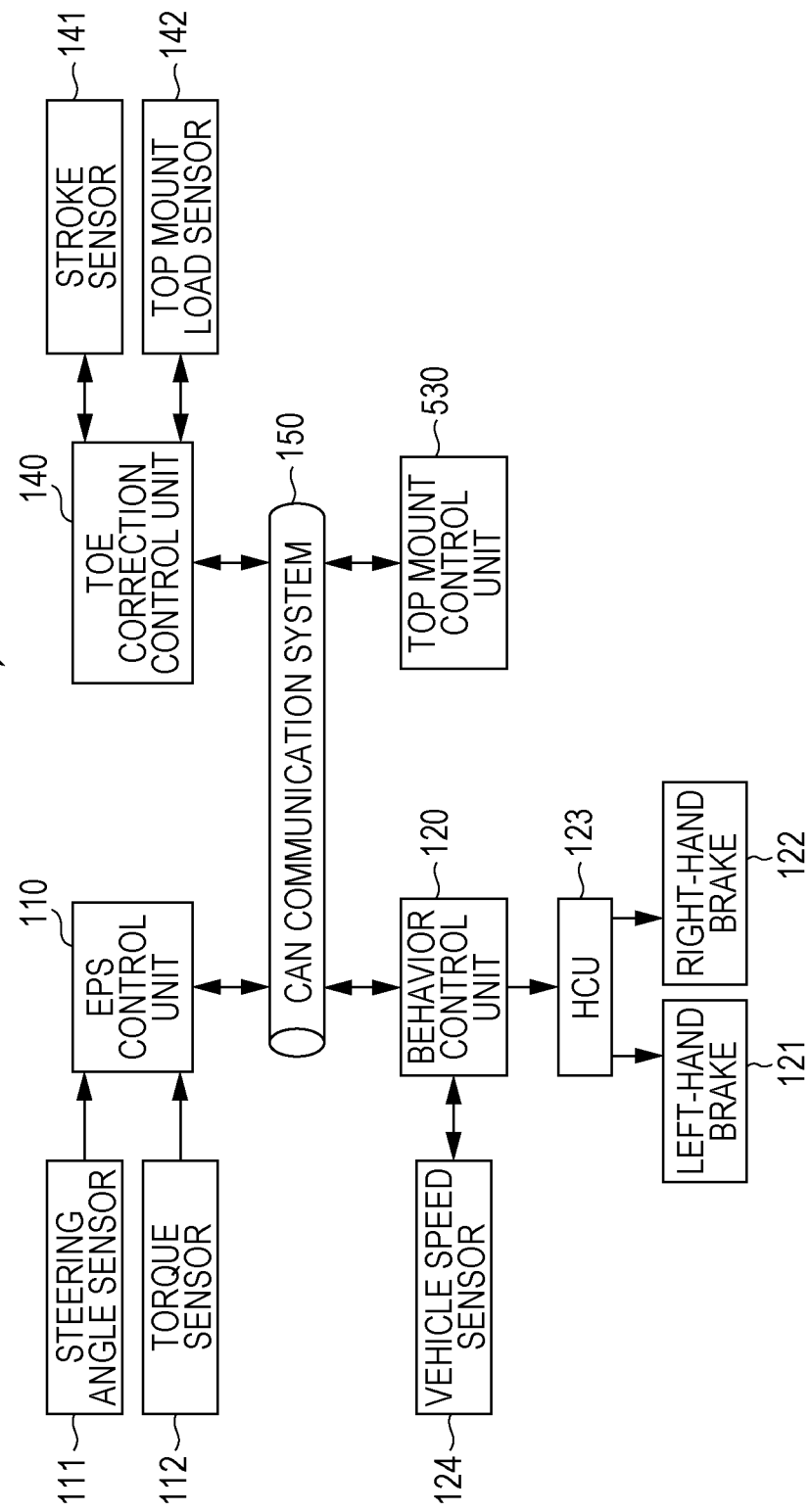
FIG. 23 is a block diagram illustrating a configuration of a control system of a suspension device to which a seventh implementation of the present invention has been applied.

Next, a suspension device to which a seventh implementation of the present invention has been applied will be described. The suspension device according to the seventh implementation includes a top mount which can be expanded or contracted in the shaft direction of the damper by filling fluid such as air or the like thereto, and is for cancelling influence of longitudinal force compliance steer at the initial stage of turning by control of the top mount. FIG. 23 is a block diagram illustrating a configuration of a control system of the suspension device according to the seventh implementation. The suspension control system according to the seventh implementation includes a top mount control unit 530 instead of the driving control unit 130 according to the first implementation, and so forth. The top mount control unit 530 controls air injection to the top mounts of the left and right damper units 70 to expand or contract the top mounts in the damper shaft direction.

Figure 24:
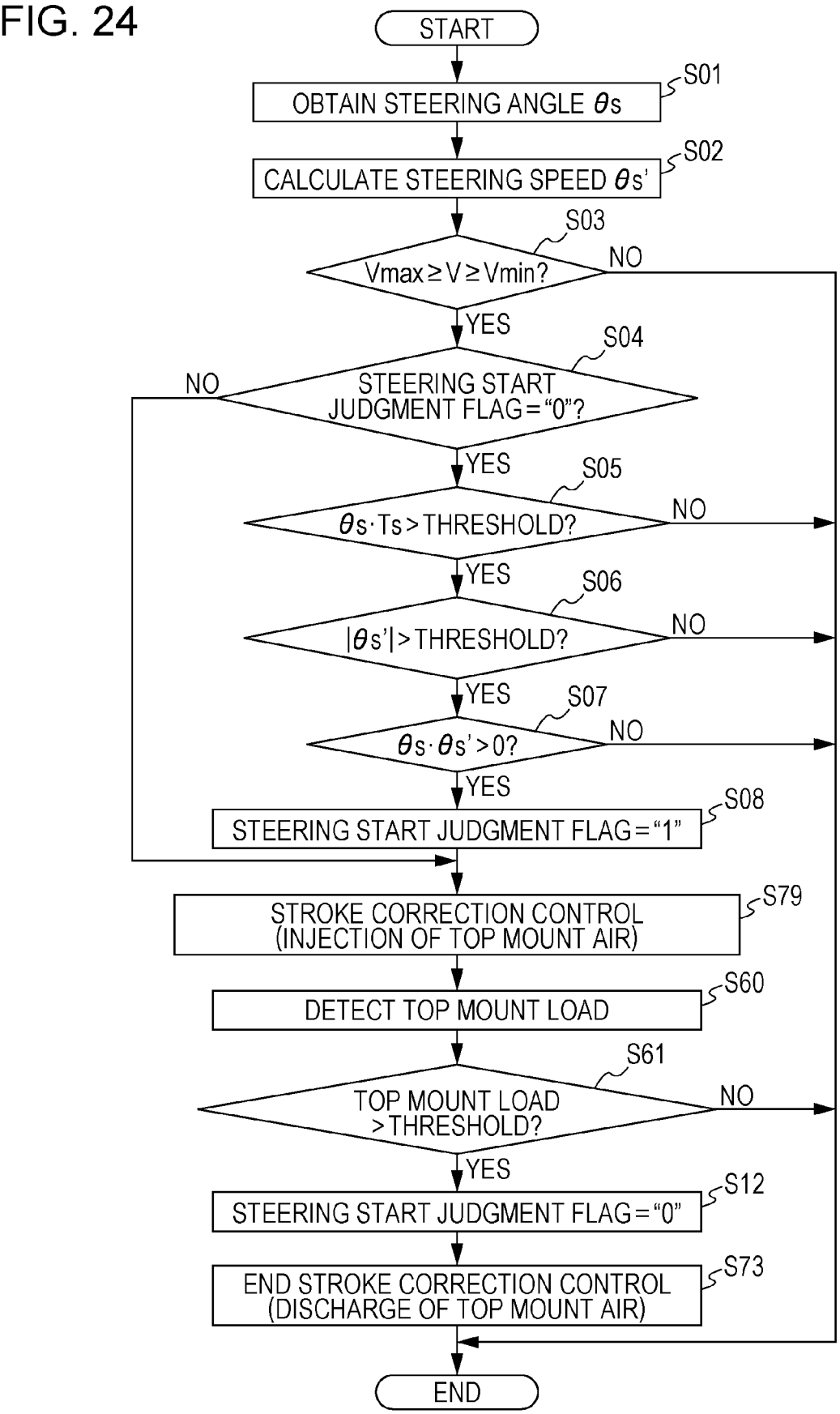
FIG. 24 is a flowchart illustrating toe angle correction control of the suspension device according to the seventh implementation.

FIG. 24 is a flowchart illustrating toe angle correction control of the suspension device according to the seventh implementation. As illustrated in FIG. 24, control according to the seventh implementation differs from the control according to the first implementation illustrated in FIG. 9 in that stroke correction control for injecting air to the top mount on the outer wheel side to expand the stroke is performed in step S79, and also this stroke correction control is terminated in step S73. Also, the control according to the seventh implementation differs from the control according to the first implementation illustrated in FIG. 9 in that the top mount load of the damper units 70 is detected in step S60, and in step S61 the top mount load is compared with a threshold, and in the case that the top mount load is greater than the threshold, the toe correction control unit 140 proceeds to step S12, and in other cases, terminates the series of processing (returns to the main routine).

Figure 25:
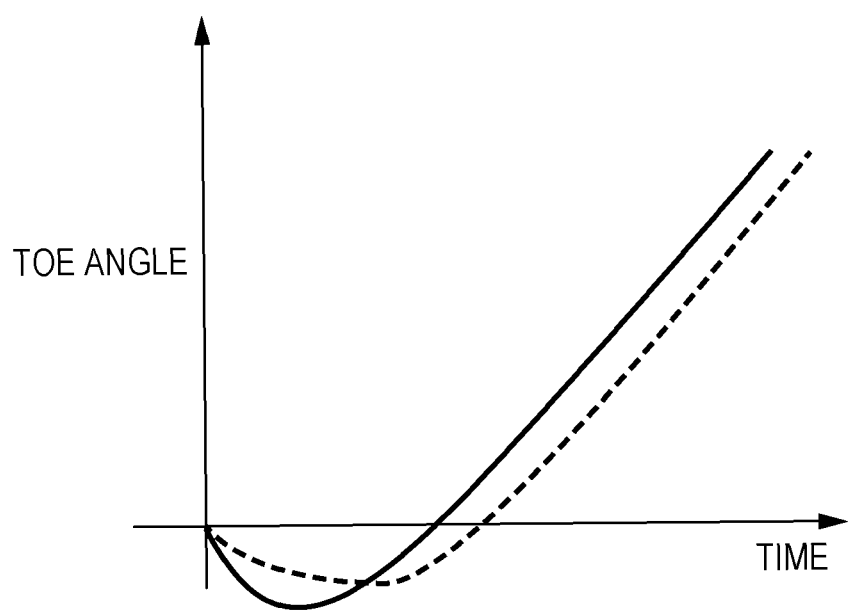
FIG. 25 is a graph schematically illustrating a transition example of a rear wheel toe angle in the suspension device according to the seventh implementation.

FIG. 25 is a graph schematically illustrating a transition example of a rear wheel toe angle in the suspension device according to the seventh implementation. In the case of having performed no stroke correction control, the rear wheel toe angle is first changed to the toe-out direction by the longitudinal force compliance steer properties, and thereafter, upon stroke change or lateral force of the suspension occurring, the rear wheel toe angle is changed to the toe-in side by the bump steer properties and lateral force compliance steer properties. In the case of having performed the stroke correction control, the top mount is expanded at the initial stage of turning to increase input load to the damper, sticking of the damper units 70 is released at an early stage to facilitate the initial stroke, and the bump steer properties are generated at an early stage to reduce the period during which influence of the longitudinal force compliance steer properties is manifested, whereby steering stability can be improved.

Eighth Implementation

Figure 26:
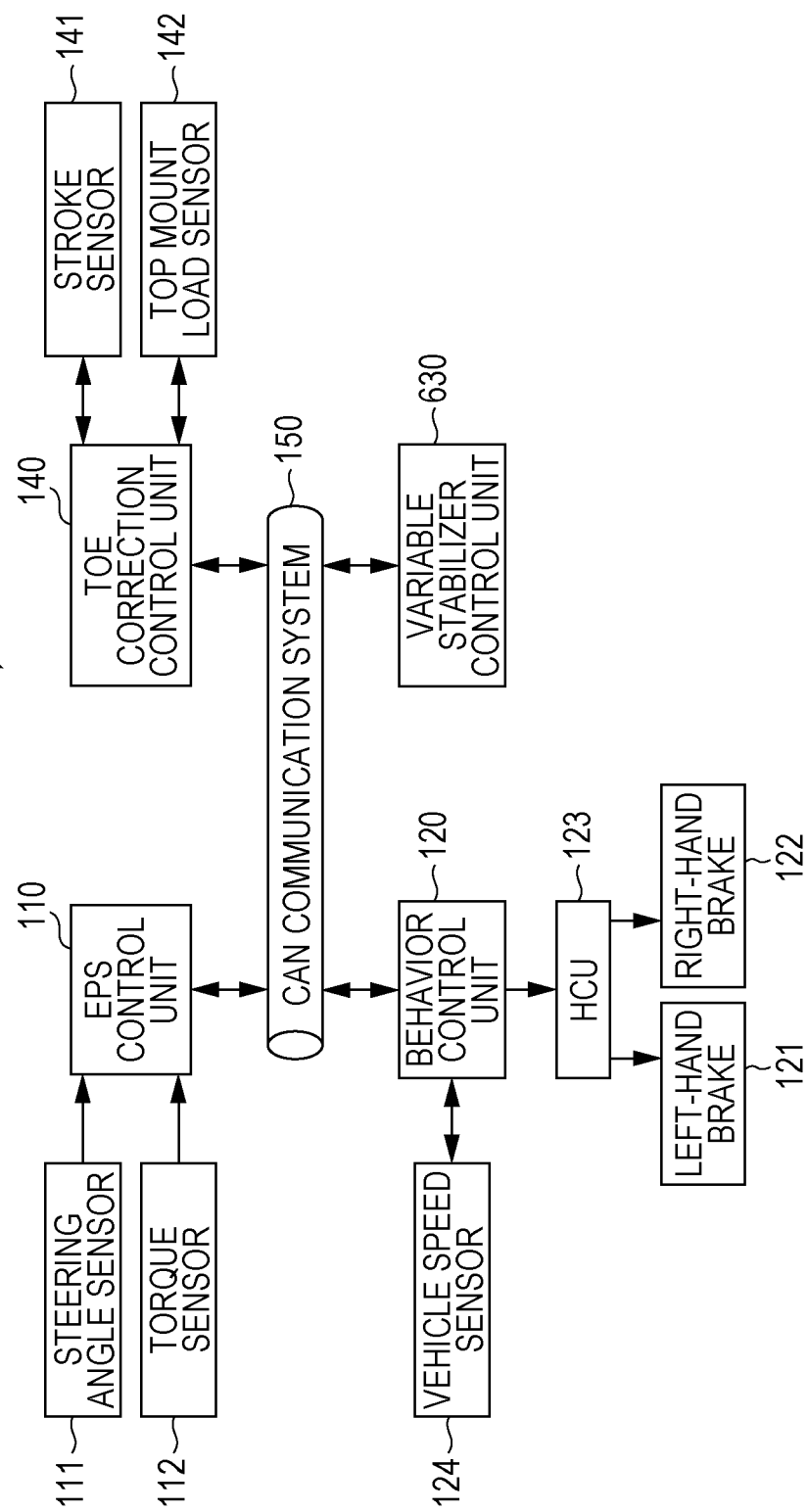
FIG. 26 is a block diagram illustrating a configuration of a control system of a suspension device to which an eighth implementation of the present invention has been applied.

Next, a suspension device to which an eighth implementation of the present invention has been applied will be described. The suspension device according to the eighth implementation is a variable rigidity stabilizer of which the roll rigidity can be changed by the stabilizer 80, and is for cancelling influence of longitudinal force compliance steer at the initial stage of turning by roll rigidity control. FIG. 26 is a block diagram illustrating a configuration of a control system of the suspension device according to the eighth implementation. The suspension control system according to the eighth implementation includes a variable stabilizer control unit 630 instead of the driving control unit 130 according to the first implementation, and so forth. The variable stabilizer control unit 630 controls an actuator, which is not illustrated, provided to the stabilizer 80 to change roll rigidity.

Figure 27:
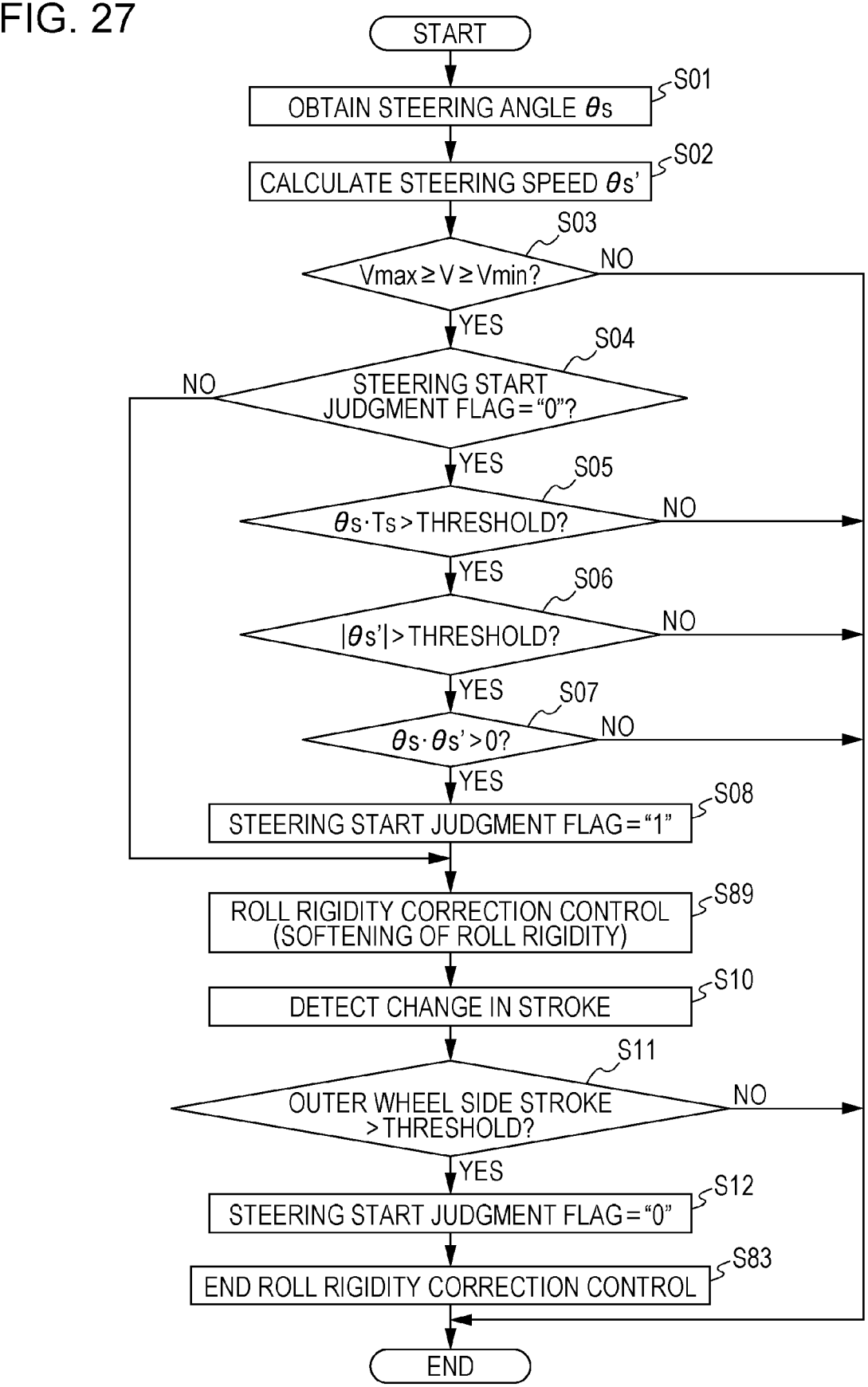
FIG. 27 is a flowchart illustrating toe angle correction control of the suspension device according to the eighth implementation.

FIG. 27 is a flowchart illustrating toe angle correction control of the suspension device according to the eighth implementation. As illustrated in FIG. 27, control according to the eighth implementation differs from the control according to the first implementation illustrated in FIG. 9 in that roll rigidity correction control for decreasing (softening) the roll rigidity is performed in step S89, and also this roll rigidity correction control is terminated in step S83.

Figure 28:
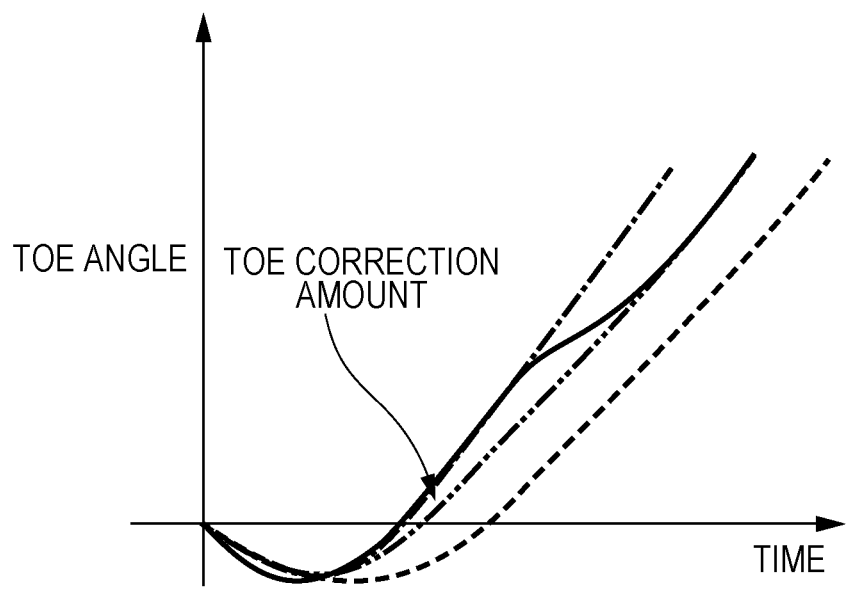
FIG. 28 is a graph schematically illustrating a transition example of a rear wheel toe angle in the suspension device according to the eighth implementation.

FIG. 28 is a graph schematically illustrating a transition example of a rear wheel toe angle in the suspension device according to the eighth implementation. In FIG. 28, transition of the rear wheel toe angle in the case that the roll rigidity is steadily lowered is illustrated by a two-dot chain line. In the case of having performed no roll rigidity correction control, the rear wheel toe angle is first changed to the toe-out direction by the longitudinal force compliance steer properties, and thereafter, upon stroke change or lateral force of the suspension occurring, the rear wheel toe angle is changed to the toe-in side by the bump steer properties and lateral force compliance steer properties. In the case of having performed the roll rigidity correction control, the roll rigidity is lowered at the initial stage of turning to facilitate roll of the vehicle body, sticking of the damper units 70 is released at an early stage to facilitate the initial stroke, and the bump steer properties are generated at an early stage to reduce the period during which influence of the longitudinal force compliance steer properties manifested, whereby steering stability can be improved. Also, after bump steer and lateral force compliance steer are sufficiently generated, the roll rigidity is returned to the initial state, whereby steering stability can be improved.

Ninth Implementation

Figure 29:
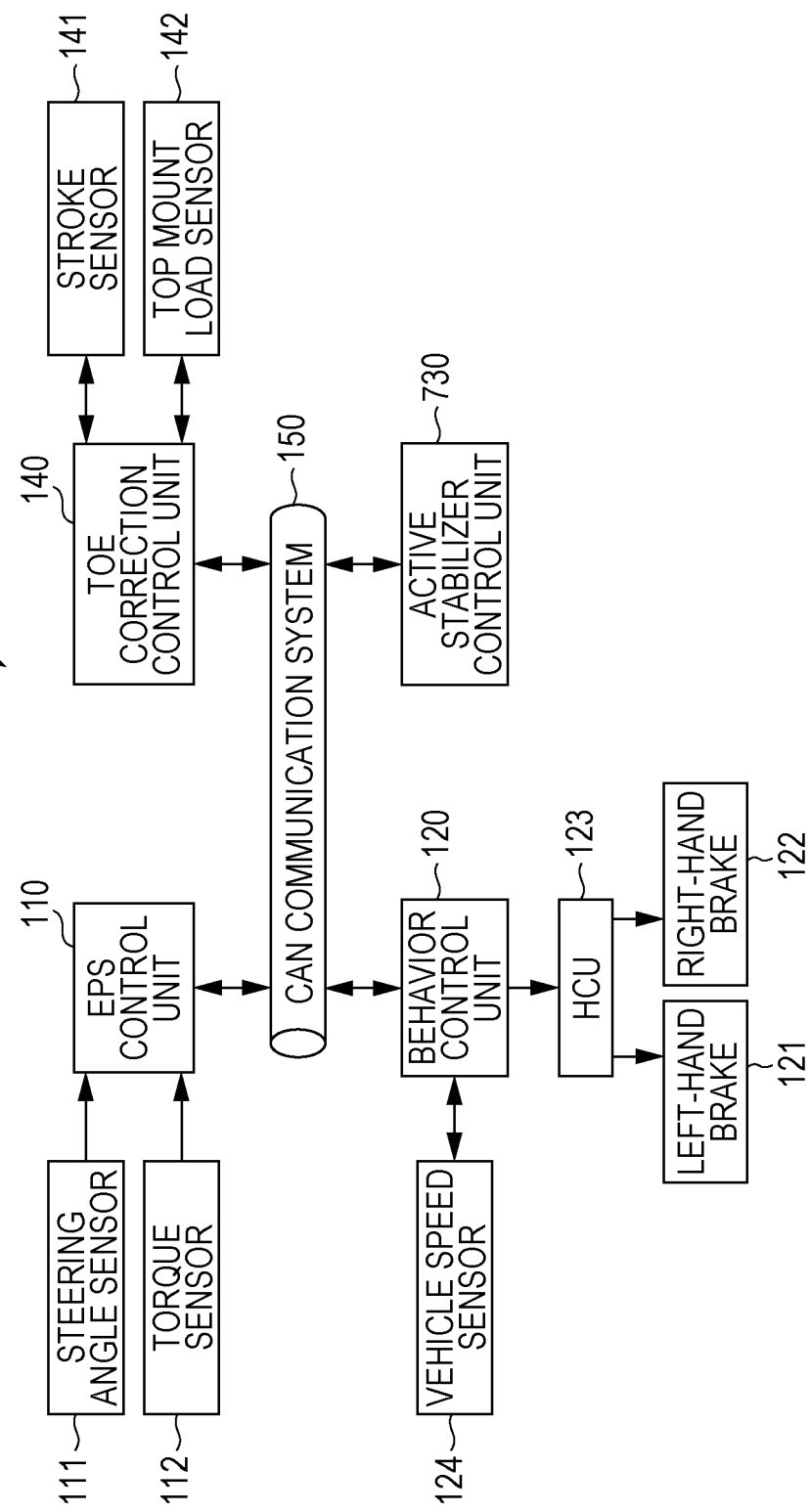
FIG. 29 is a block diagram illustrating a configuration of a control system of a suspension device to which a ninth implementation of the present invention has been applied.

Next, a suspension device to which a ninth implementation of the present invention has been applied will be described. The suspension device according to the ninth implementation is an active stabilizer capable of generating a moment in the roll direction of the vehicle by applying torque in a direction where stabilizer bars divided at an intermediate portion by the stabilizer 80 are twisted, and is for cancelling influence of longitudinal force compliance steer at the initial stage of turning by the control of the active stabilizer. FIG. 29 is a block diagram illustrating a configuration of a control system of the suspension device according to the ninth implementation. The suspension control system according to the ninth implementation includes an active stabilizer control unit 730 instead of the driving control unit 130 according to the first implementation, and so forth. The active stabilizer control unit 730 controls an actuator, which is not illustrated, provided to the stabilizer 80 to perform control for relatively twisting the left and right stabilizer bars.

Figure 30:
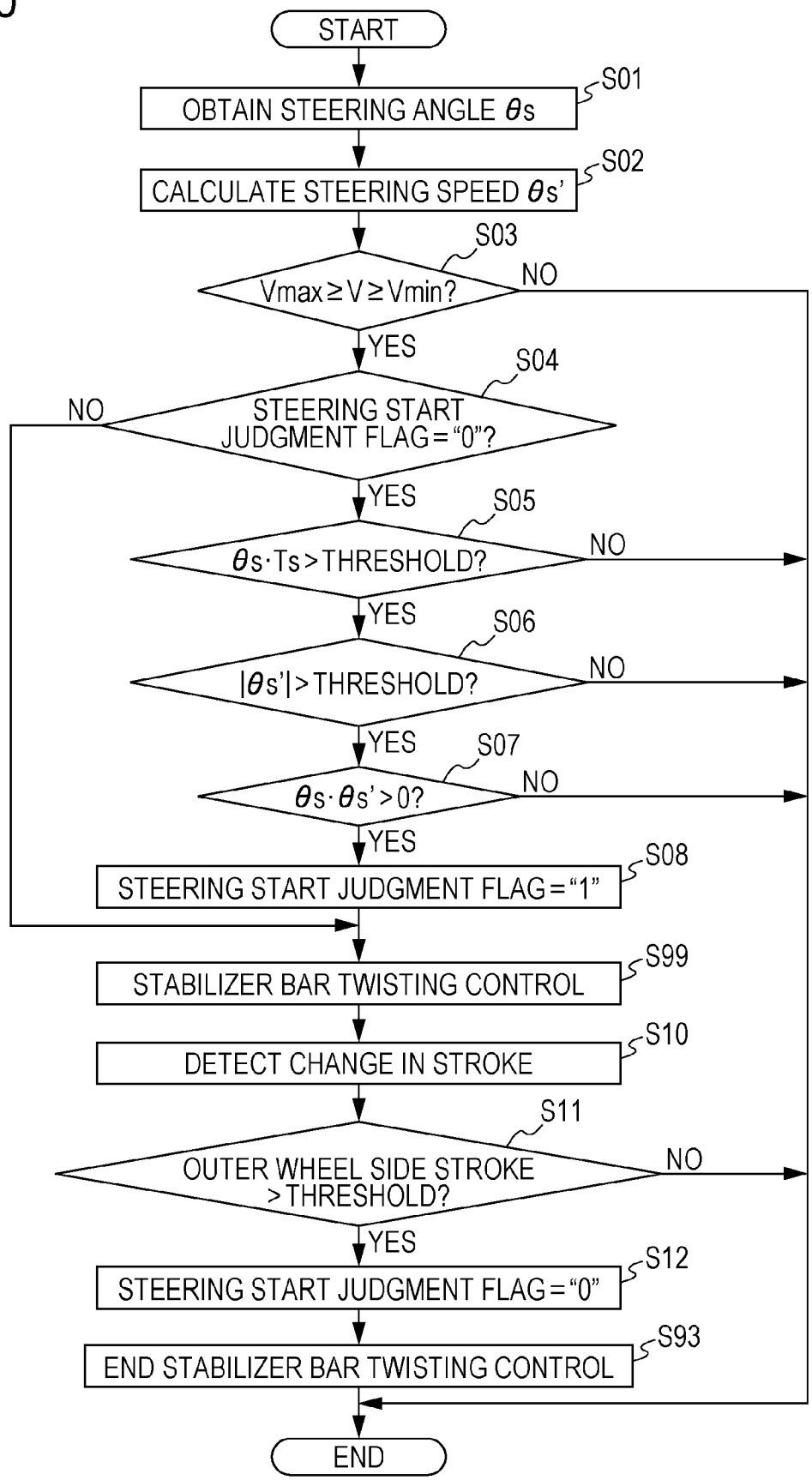
FIG. 30 is a flowchart illustrating toe angle correction control of the suspension device according to the ninth implementation.

FIG. 30 is a flowchart illustrating toe angle correction control of the suspension device according to the ninth implementation. As illustrated in FIG. 30, control according to the ninth implementation differs from the control according to the first implementation illustrated in FIG. 9 in that stabilizer bar twisting control so as to facilitate roll behavior in a direction where the outer wheel side is bumped by the active stabilizer in step S99, and also this stabilizer bar twisting control is terminated in step S93. According to the above-described ninth implementation, roll is substantially forcibly generated using the active stabilizer to stroke the suspension, whereby bump steer can be generated at an early stage, and steering stability can be improved preventing the outer wheel to be steered to the toe-out side by longitudinal force compliance steer.

Tenth Implementation

Figure 31:
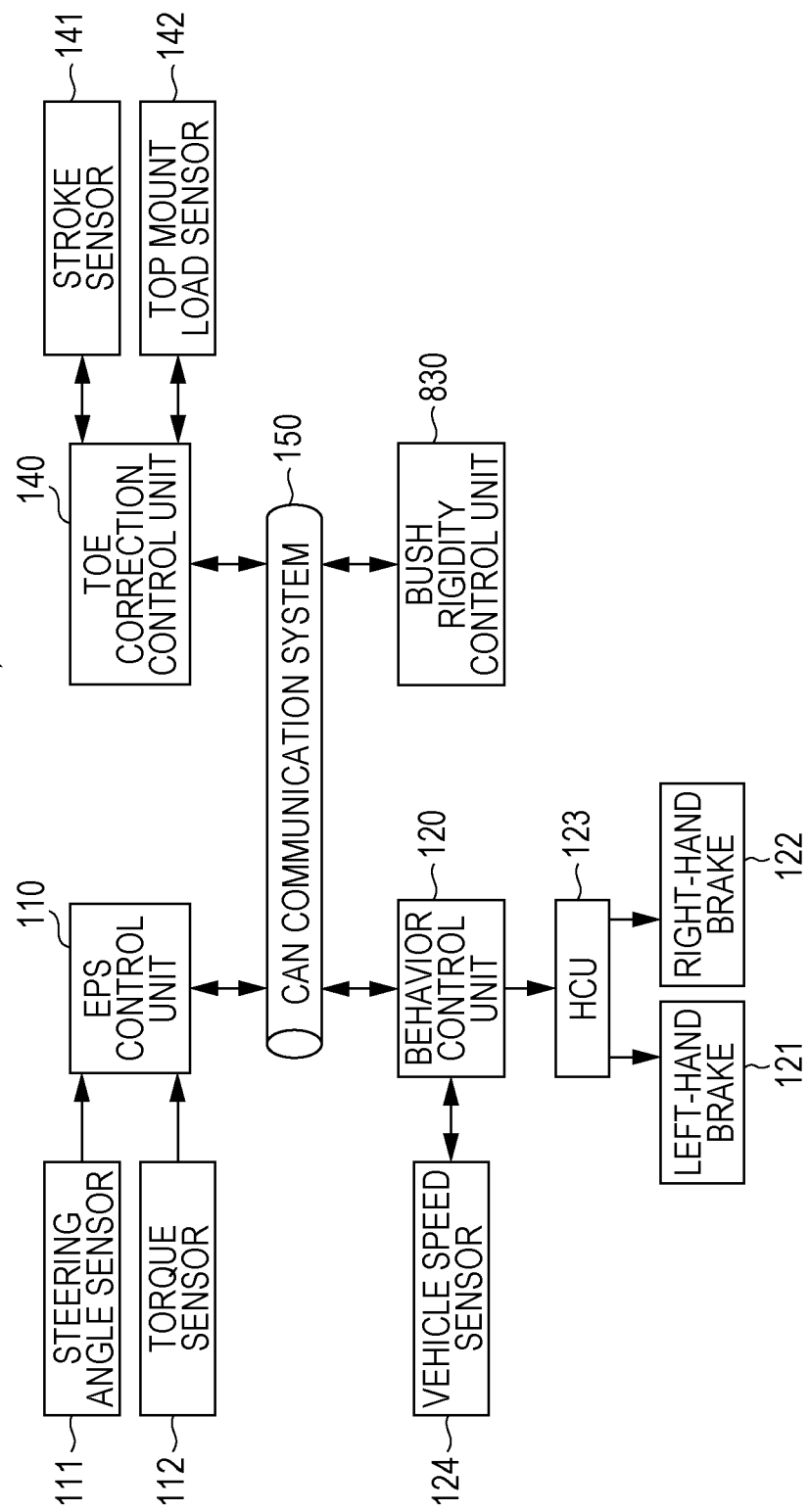
FIG. 31 is a block diagram illustrating a configuration of a control system of a suspension device to which a tenth implementation of the present invention has been applied.

Next, a suspension device to which a tenth implementation of the present invention has been applied will be described. The suspension device according to the tenth implementation includes a variable rigidity rubber bush of which the spring constant can be changed (variable rigidity bush, which is a liquid filled bush in which an MR fluid of which the viscoelastic properties are changed by a magnetic field externally being applied is filled, of which the spring constant can be changed according to an applied state of the magnetic field) as rubber bushes on the vehicle body side of the front lateral link 30 and rear lateral link 40, and is for controlling the spring constants of these to invert the longitudinal force compliance steer properties. FIG. 31 is a block diagram illustrating a configuration of a control system of the suspension device according to the tenth implementation. The suspension control system according to the tenth implementation includes a bush rigidity control unit 830 instead of the driving control unit 130 according to the first implementation, and so forth. The bush rigidity control unit 830 is for controlling the spring constant of the rubber bush on the vehicle body of the front lateral link 30.

Figure 32:
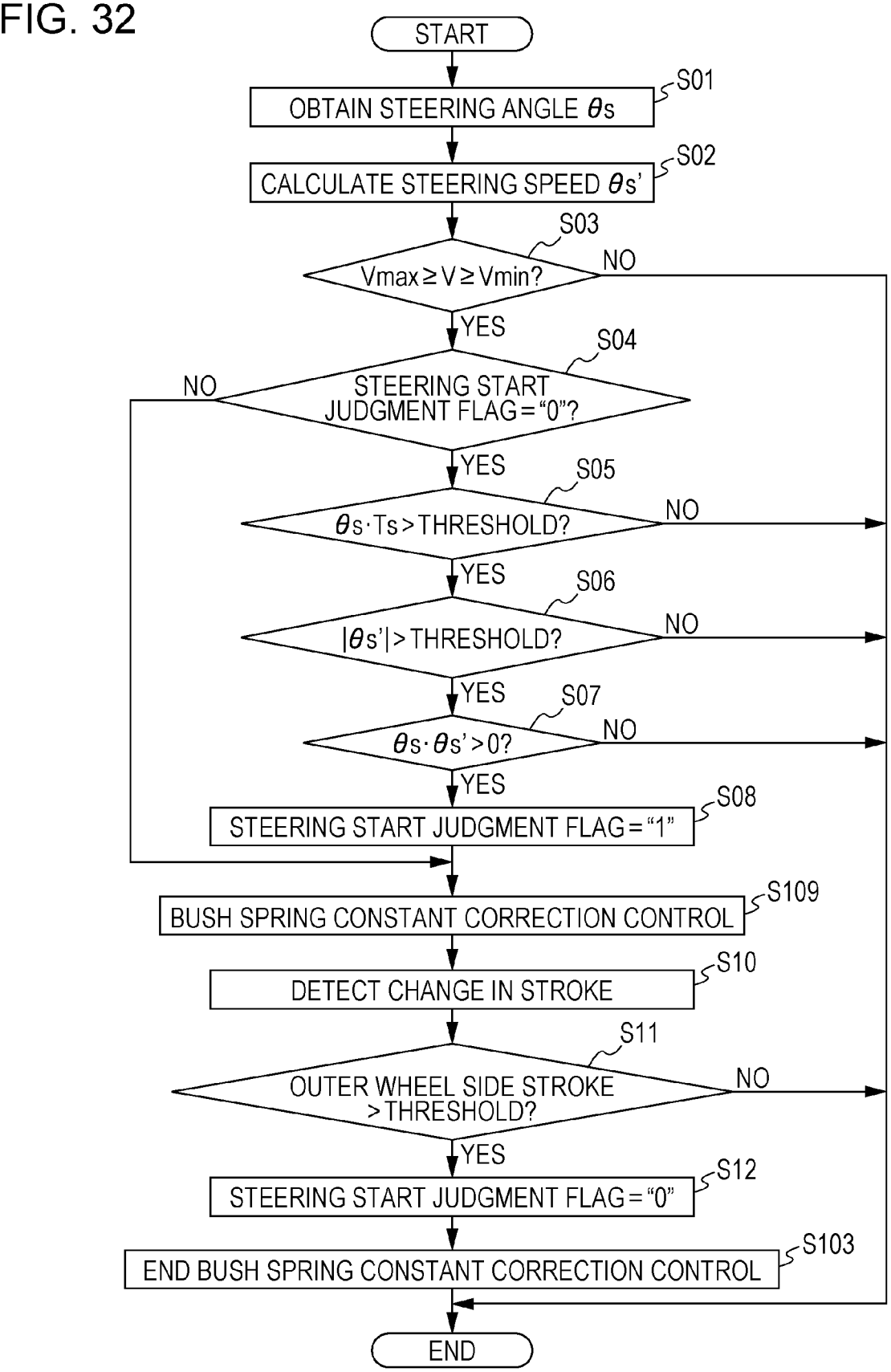
FIG. 32 is a flowchart illustrating toe angle correction control of the suspension device according to the tenth implementation.

FIG. 32 is a flowchart illustrating toe angle correction control of the suspension device according to the tenth implementation. As illustrated in FIG. 32, control according to the tenth implementation differs from the control according to the first implementation illustrated in FIG. 9 in that control for increasing the spring constants of the rubber bushes of the front lateral links 30 on the outer wheel side and inner wheel side is performed in step S109, and also this spring constant control is terminated in step S103.

Figure 33:
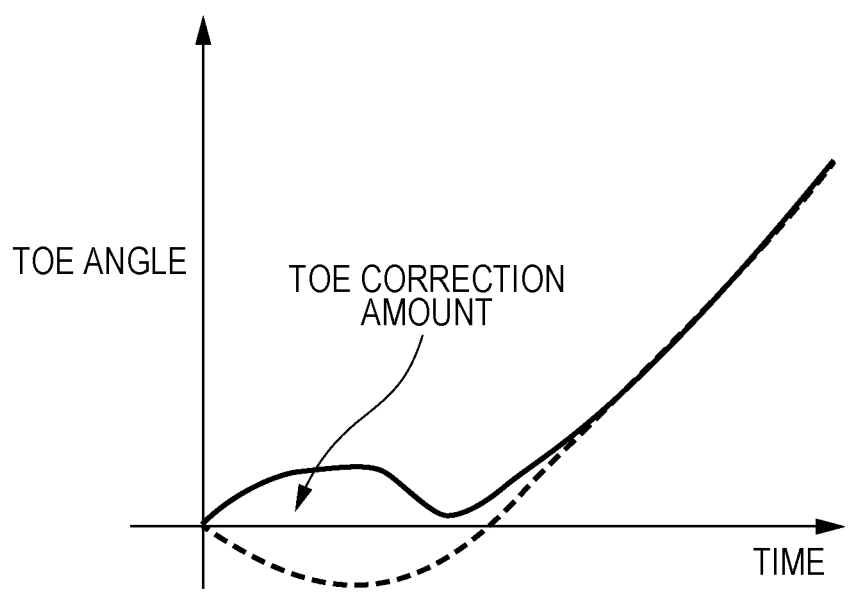
FIG. 33 is a graph schematically illustrating a transition example of a rear wheel toe angle in the suspension device according to the tenth implementation.

FIG. 33 is a graph schematically illustrating a transition example of a rear wheel toe angle in the suspension device according to the tenth implementation. According to the tenth implementation, spring constant control for the bushes of the front lateral links 30 is performed, whereby rigidity difference between the rubber bush of a front lateral link 30 and the rubber bush of a rear lateral link 40 is inverted between the initial stage of turning and otherwise. As a result thereof, the longitudinal force compliance steer properties can be inverted in the tenth implementation, in the case that such control is not performed. Thus, according to the tenth implementation, steering stability can be improved preventing the outer wheel from being steered to the toe-out side and the inner wheel from being steered to the toe-in side at the initial stage of turning. Note that substantially the same advantage can be obtained even when the spring constant of the bush of a rear lateral link 40 is temporarily decreased instead of or together with temporarily increasing the spring constant of the bush of a front lateral link 30.

Eleventh Implementation

Figure 34:
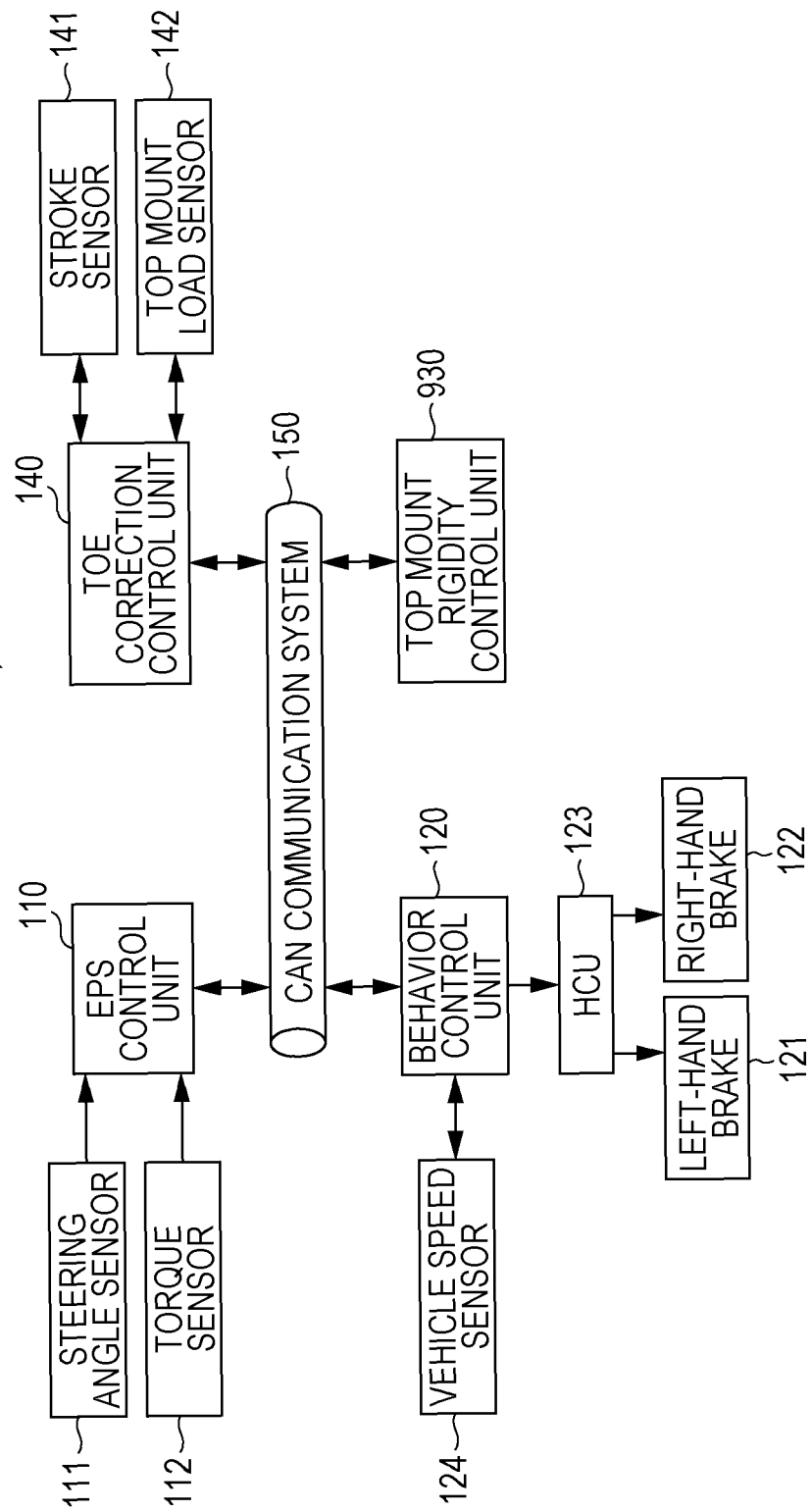
FIG. 34 is a block diagram illustrating a configuration of a control system of a suspension device to which an eleventh implementation of the present invention has been applied.

Next, a suspension device to which an eleventh implementation of the present invention has been applied will be described. The suspension device according to the eleventh implementation includes a variable rigidity top mount of which the spring constant can be changed as the top mounts of the upper end portions of the damper units 70, and is for reducing influence of longitudinal force compliance steer by controlling this spring constant. FIG. 34 is a block diagram illustrating a configuration of a control system of the suspension device according to the eleventh implementation. The suspension control system according to the eleventh implementation includes a top mount rigidity control unit 930 instead of the driving control unit 130 according to the first implementation, and so forth. The top mount rigidity control unit 930 is for controlling the spring constant of the top mounts on the damper units 70.

Figure 35:
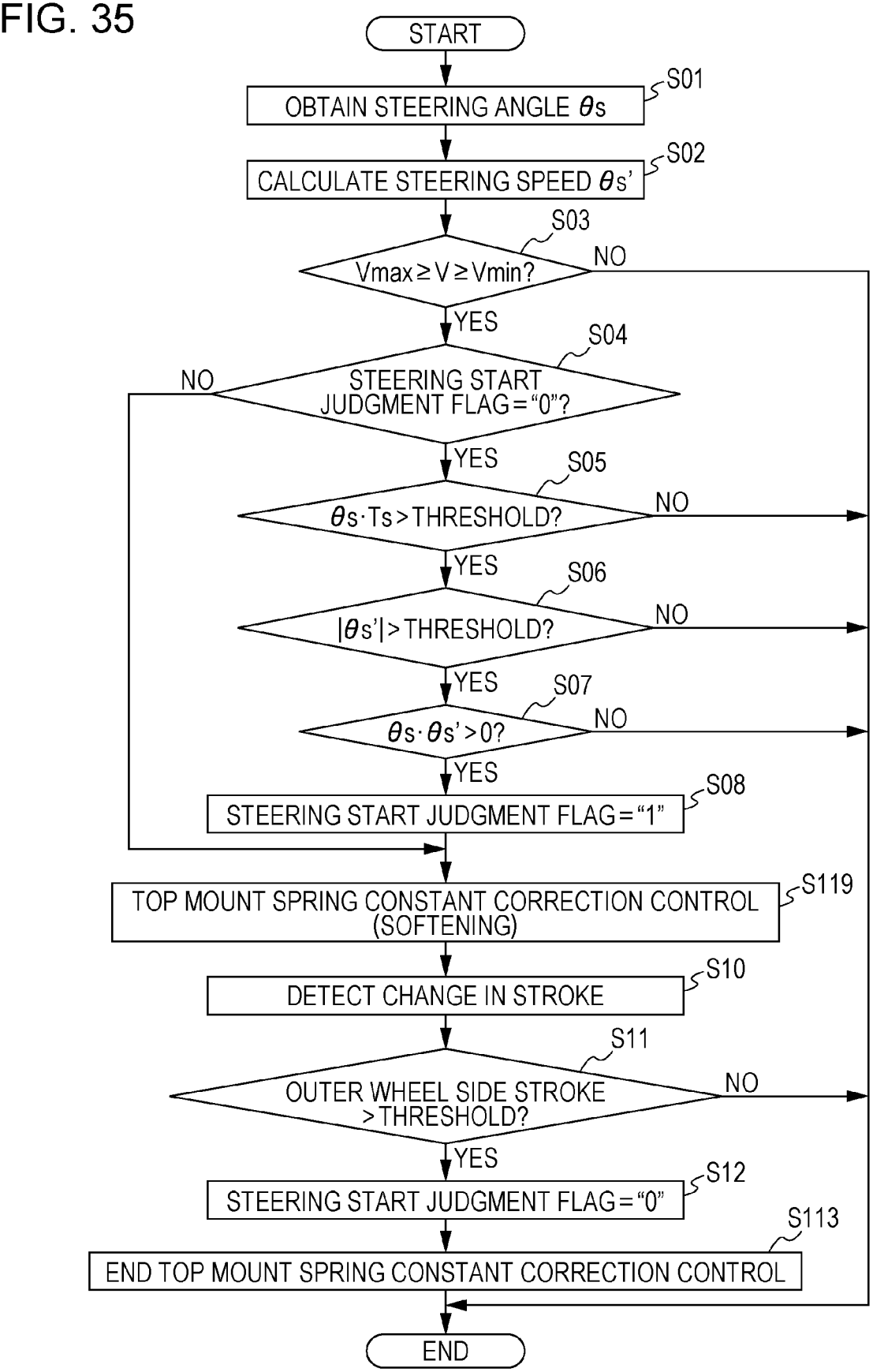
FIG. 35 is a flowchart illustrating toe angle correction control of the suspension device according to the eleventh implementation.

FIG. 35 is a flowchart illustrating toe angle correction control of the suspension device according to the eleventh implementation. As illustrated in FIG. 35, control according to the eleventh implementation differs from the control according to the first implementation illustrated in FIG. 9 in that control for increasing the spring constants of the top mounts on the outer wheel side and inner wheel side is performed in step S119, and also this spring constant control is terminated in step S113.

Figure 36:
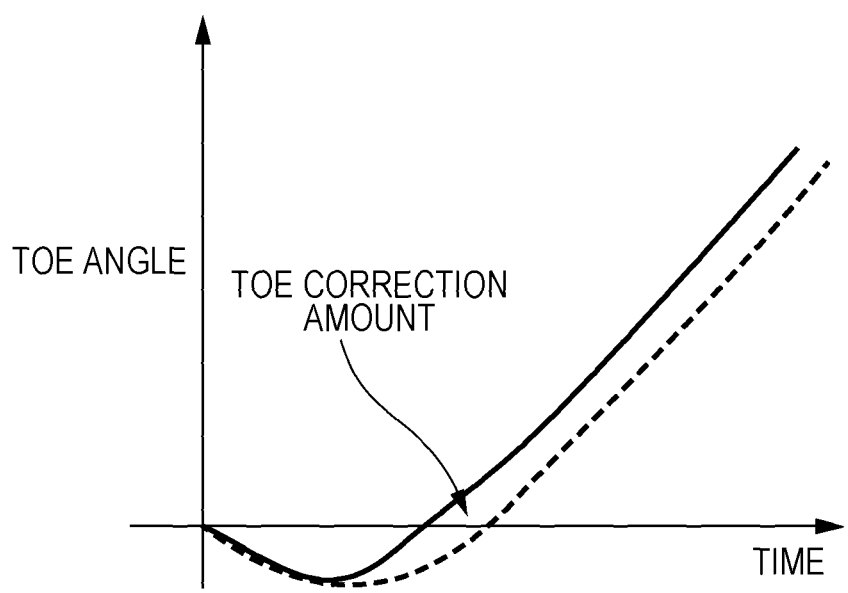
FIG. 36 is a graph schematically illustrating a transition example of a rear wheel toe angle in the suspension device according to the eleventh implementation.

FIG. 36 is a graph schematically illustrating a transition example of a rear wheel toe angle in the suspension device according to the eleventh implementation. According to the eleventh implementation, the above-described spring constant control of the top mounts is performed to increase the initial input to the damper units 70, and to release sticking of the damper units 70 at an early stage to facilitate the initial stroke, and to generate the bump steer properties at an early stage to reduce the period during which influence due to the longitudinal force compliance steer properties is manifested, whereby steering stability can be improved.

Twelfth Implementation

Next, a suspension device to which a twelfth implementation of the present invention has been applied will be described. The suspension device according to the twelfth implementation changes, of the bushes provided to the end portions of the front lateral links 30, rear lateral links 40, upper links 50, and trailing links 60, the spring constants of some bushes (particular bushes on the toe-in side) capable of rotating the housing 20 to the toe-in side by the spring constants being changed (increased or decreased), and some bushes (particular bushes on the toe-out side) capable of rotating the housing 20 to the toe-out side to reduce influence of longitudinal force compliance steer. Change in the spring constants of such bushes can be realized using a liquid filled bush in which is sealed an MR fluid of which the viscoelastic properties are changed by applying a magnetic field, or the like, for example.

Figure 37:
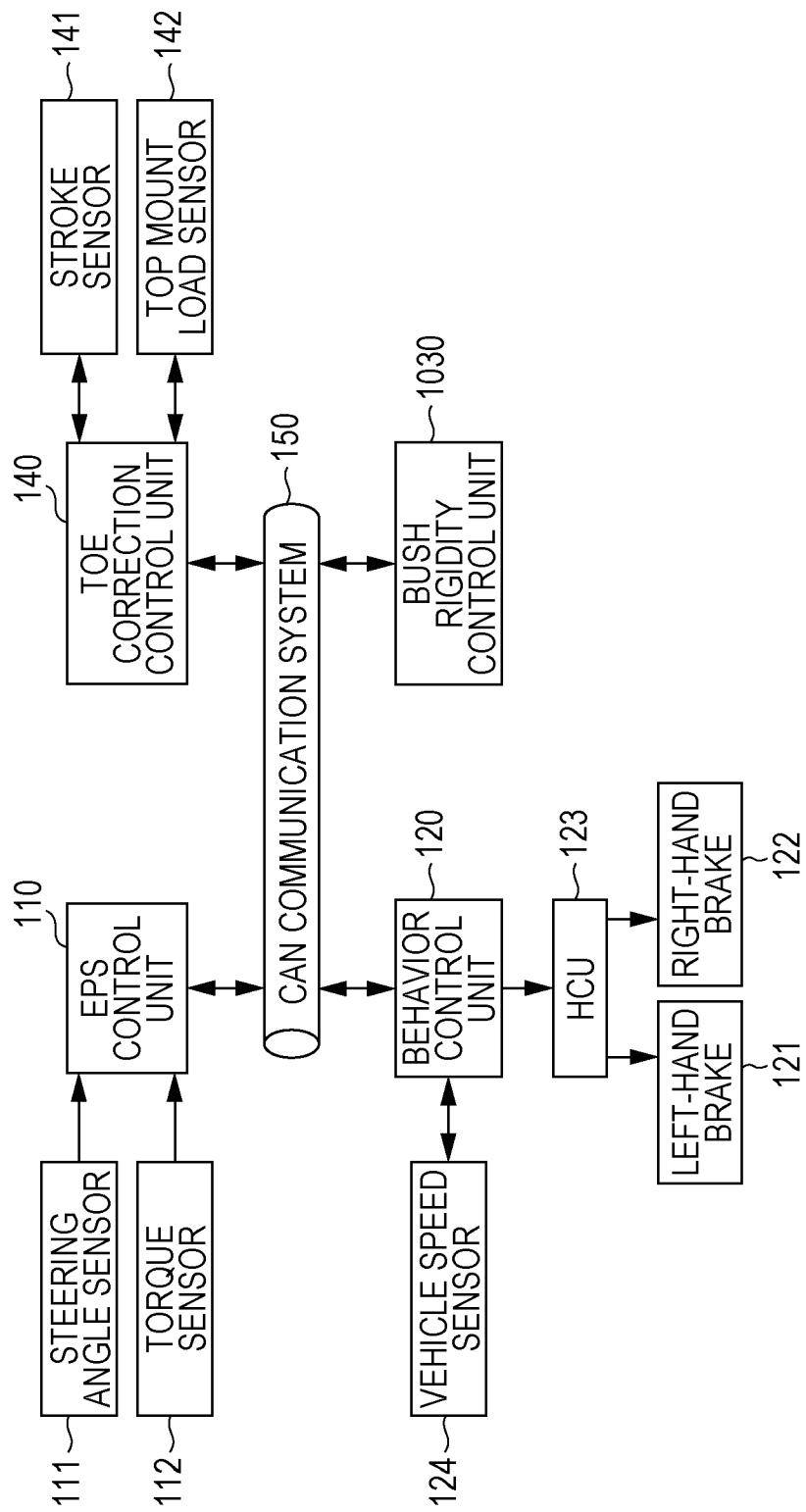
FIG. 37 is a block diagram illustrating a configuration of a control system of a suspension device to which a twelfth implementation of the present invention has been applied.

FIG. 37 is a block diagram illustrating a configuration of a control system of the suspension device according to the twelfth implementation. The suspension control system according to the twelfth implementation includes a bush rigidity control unit 1030 instead of the driving control unit 130 according to the first implementation, and so forth. The bush rigidity control unit 1030 is for controlling the spring constants of the particular bushes on the toe-in side and the particular bushes on the toe-out side described above.

Figure 38:
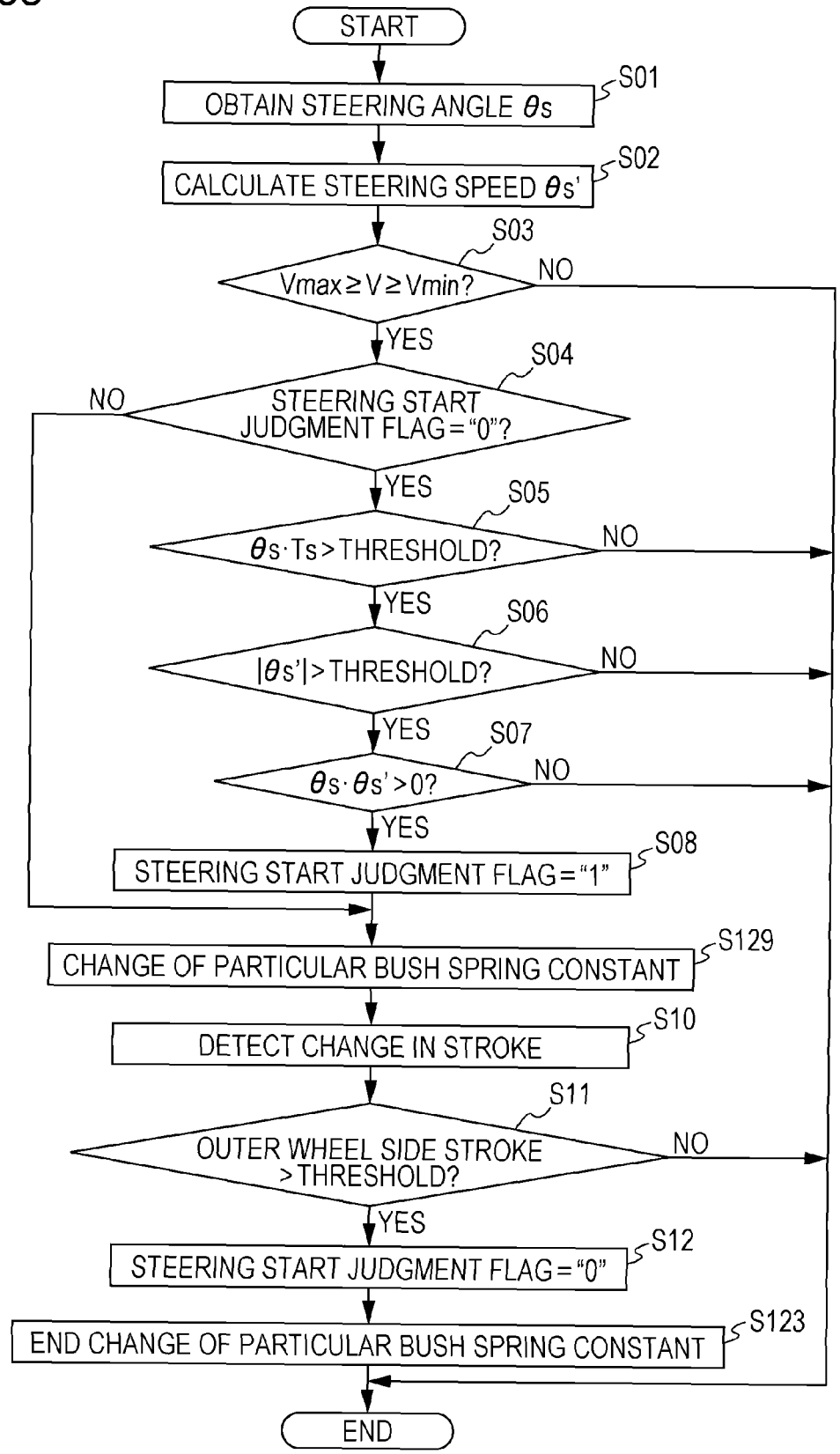
FIG. 38 is a flowchart illustrating toe angle correction control of the suspension device according to the twelfth implementation.

FIG. 38 is a flowchart illustrating toe angle correction control of the suspension device according to the twelfth implementation. As illustrated in FIG. 38, control according to the twelfth implementation differs from the control according to the first implementation illustrated in FIG. 9 in that control for changing the spring constants of the particular bushes on the toe-in side at the turning outer wheel side and the particular bushes on the toe-out side at the turning inner wheel side is performed in step S129, and also this spring constant change is terminated in step S123.

Figure 39:
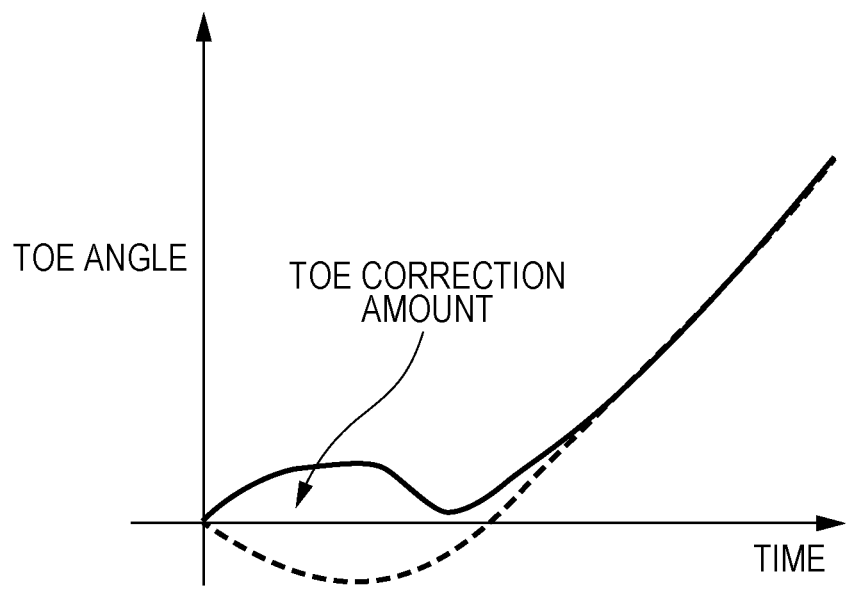
FIG. 39 is a graph schematically illustrating a transition example of a rear wheel toe angle in the suspension device according to the twelfth implementation.

FIG. 39 is a graph schematically illustrating a transition example of a rear wheel toe angle in the suspension device according to the twelfth implementation. According to the twelfth implementation, the housing 20 is rotated to the toe-in side at the turning outer wheel side, and is rotated to the toe-out side at the turning inner wheel side by the rigidity control of the link bushes, whereby steering stability can be improved suppressing influence of longitudinal force compliance steer.

Modifications

The present invention is not restricted to the above-described implementation s, and various alterations and modifications may be made, which are also encompassed in the technical scope of the present invention.

(1) The configuration of the suspension device is not restricted to the above-described implementation s, and may be changed as appropriate. For example, the form of the suspension device is not restricted to the double wishbone type such as the implementation, and may be another form such as a strut type, multi-link type, trailing arm type, or the like. Also, the configuration of the control system is not restricted to any particular configuration.

(2) According to the first and second implementation s, driving force difference is generated between both rear wheels using the motor for independently applying driving force to both rear wheel, but a method for generating driving force difference is not restricted to this, and driving force difference may be generated by another technique.

For example, driving force difference may be generated by distributing output of an electric motor which drives the engine and both rear wheels using a torque vectoring device configured to propagate the output by changing torque distributions of both rear wheels.

(3) The toe control according to driving force difference as with the first and second implementations, and the toe control according to driving force difference as with the third and fourth implementations may be employed together.

For example, in the case of a suspension device having toe-in properties due to the tie rods being situated behind the wheel center, this device may have a configuration in which driving force is applied to the outer wheel, and also braking force is applied to the inner wheel.

(4) Though all of the first to fourth implementations are suspension devices having toe-out properties due to the tie rods being situated behind the wheel center, the present invention may be applied to a suspension device having toe-in properties due to the tie rods being situated behind the wheel center. In this case, contents of control have to be inverted between the inner wheel and the outer wheel.

(5) According to the implementations, toe correction control is terminated based on damper stroke, top mount load, or the like, but the method for ending the toe correction control is not restricted to these, and the toe correction control may be terminated by another technique. For example, the control may be terminated for predetermined time after start of turning. Also, a technique for gradually changing control amount is not restricted to a particular technique.

(6) Though braking force difference is generated using a motor for independently applying braking force to both rear wheels in the implementations, the method for generating braking force difference is not restricted to this, and braking force difference between both wheels may be generated by braking control such as ESC or the like. In this case, in order to apply braking force to a ground contact point, contents of the control are changed according to toe change properties due to the tie rods being situated behind the wheel center at the ground contact point. For example, the suspension device 1 has the toe-in properties due to the tie rods being situated behind the wheel center at the ground contact point, and accordingly, toe-out due to longitudinal force steer at the initial stage of turning may be suppressed by increasing braking force of the turning outer wheel.

The invention claimed is:

1. A suspension device with longitudinal force compliance steer properties to steer a rear wheel of a vehicle to either of the toe-in and toe-out sides according to increase in longitudinal force applied to wheel treads of the rear wheel, the suspension device comprising:
   a hub bearing housing that turnably supports the rear wheel of a vehicle on the circumference of the axle;
   a suspension link of which both edges are pivotally attached to a vehicle body and a hub bearing respectively, the suspension link being configured to support the hub bearing housing so as to enable stroking as to the vehicle body;
   a suspension spring that generates reaction force corresponding to relative displacement amount in the longitudinal direction of the hub bearing housing as to the vehicle body;
   a damper that generates damping force corresponding to relative speed in the longitudinal direction of the hub bearing housing as to the vehicle body; and
   a toe change generating unit that generates toe change in a direction where toe change due to the longitudinal force compliance steer properties is temporarily cancelled out or suppressed at an early stage of turning of the vehicle.

2. The suspension device according to claim 1, wherein the toe change generating unit includes a braking/driving force difference generating unit to generate braking/driving force difference between both rear wheels.

3. The suspension device according to claim 2, having toe-out properties due to tie rods being situated behind the wheel center, to change the hub bearing housing in the toe-out direction according to braking force applied to the wheel center, wherein the braking/driving force difference generating unit includes a driving unit to enable driving force of both wheels to be independently controlled to increase driving force on the turning outer wheel side as compared to driving force on the turning inner wheel side.

4. The suspension device according to claim 2, having toe-out properties due to the tie rods being situated behind the wheel center, to change the hub bearing housing in the toe-out direction according to braking force applied to the wheel center, wherein the braking/driving force difference generating unit includes a braking unit to enable braking force of both wheels to be independently controlled to decrease braking force on the turning outer wheel side as compared to braking force on the turning inner wheel side.

5. The suspension device according to claim 2, having toe-out properties due to the tie rods being situated behind the wheel center, to change the hub bearing housing in the toe-out direction according to braking force applied to the wheel center, wherein the braking/driving force difference generating unit includes a driving unit to enable driving force of both wheels to be independently controlled and a braking unit configured to enable braking force of both wheels to be independently controlled to apply braking force to the turning inner wheel and also to apply driving force to the turning outer wheel.

6. The suspension device according to claim 1, wherein the toe change generating unit performs generation control of the toe change such that toe change amount changes according to vertical load change of the rear wheels.

7. The suspension device according to claim 1, wherein the toe change generating unit gradually reduces toe change amount at the time of ending the occurrence of the toe change.

8. The suspension device according to claim 1, wherein the toe change generating unit terminates generation of the toe change in response to the stroking of the suspension spring and the damper reaching equal to or greater than a predetermined value.

9. A suspension device with longitudinal force compliance steer properties to steer a rear wheel of a vehicle to either of the toe-in and toe-out sides according to increase in longitudinal force applied to wheel treads of the rear wheel, the suspension device comprising:
   a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a rear wheel steering actuator that applies a steer angle to the rear wheel;

wherein the rear wheel steering actuator applies a steer angle to the rear wheel in a direction where toe change due to the longitudinal force compliance steer properties is temporarily cancelled out or suppressed at an early stage of turning of the vehicle.

10. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a damping control unit that decreases damping force of the damper temporarily at an early stage of turning of the vehicle.

11. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body;

a stabilizer that generates reaction force according to stroke difference between the damper at the left and the damper at the right; and a roll rigidity control unit that decreases roll rigidity of the stabilizer temporarily at an early stage of turning of the vehicle.

12. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing configured to turnably support the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a toe change generating unit that generates toe change in a direction where toe change due to the longitudinal force compliance steer properties is temporarily cancelled out or suppressed at an early stage of turning of the vehicle;

wherein the toe change generating unit includes a stroke control unit configured to forcibly stroke the damper on the turning outer wheel side to the compression side.

13. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a toe change generating unit that generates toe change in a direction where toe change due to the longitudinal force compliance steer properties is temporarily cancelled out or suppressed at an early stage of turning of the vehicle;

wherein the toe change generating unit includes a load applying unit configured to apply compressive load to the damper on the turning outer wheel side.

14. The suspension device according to claim 13, wherein the toe change generating unit terminates generation of the toe change in response to load to be loaded to the damper on the turning outer wheel side reaching equal to or greater than a predetermined value.

15. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a toe change generating unit that generates toe change in a direction where toe change due to the longitudinal force compliance steer properties is temporarily cancelled out or suppressed at an early stage of turning of the vehicle;

wherein the toe change generating unit includes a roll moment generating unit configured to generate a roll moment in a direction where the damper on the turning outer wheel side is compressed.

16. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a toe change generating unit that generates toe change in a direction where toe change due to the longitudinal force compliance steer properties is temporarily cancelled out or suppressed at an early stage of turning of the vehicle;

wherein the toe change generating unit includes a mount rigidity control unit configured to temporarily increase rigidity of a variable rigidity elastic mount to be provided between the upper end portion of the damper and the vehicle, at an early stage of turning.

17. A suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a rigidity changing unit;

wherein the suspension link performs positioning of the toe direction of the housing, and also includes a front lateral link and a rear lateral link each having an elastic bush at least on one of an end portion of the vehicle body side, and an end portion of the hub bearing housing side, configured to receive tensile force due to vertical load of the rear wheel at the time of straight advance of the vehicle; and wherein the rigidity changing unit relatively increases rigidity of the rubber bush of the front lateral link temporarily at an early stage of turning as to rigidity of the rubber bush of the rear lateral link.

18. The suspension device according to claim 17, wherein the rigidity changing unit temporarily improves the rigidity of the rubber bush of the front lateral link at an early stage of turning.

19. The suspension device according to claim 17, wherein the rigidity changing unit temporarily decreases the rigidity of the rubber bush of the rear lateral link at an early stage of turning.

20. A suspension device with longitudinal force compliance steer properties to steer a rear wheel of a vehicle to either of the toe-in and toe-out sides according to increase in longitudinal force applied to wheel treads of the rear wheel, the suspension device comprising:

a hub bearing housing that turnably supports the rear wheel of the vehicle on the circumference of the axle;

a suspension link of which both edges are pivotally attached to a vehicle body and a hub bearing respectively, the suspension link being configured to support the hub bearing housing so as to able to stroke as to the vehicle body;

a suspension spring that generates reaction force corresponding to relative displacement amount in the longitudinal direction of the hub bearing housing as to the vehicle body;

a damper that generates damping force corresponding to relative speed in the longitudinal direction of the hub bearing housing as to the vehicle body; and a toe change generating unit that generates toe change in a direction where toe change due to the longitudinal force compliance steer properties is temporarily cancelled out or suppressed at an early stage of turning of the vehicle;

wherein the toe change generating unit is provided to some of the suspension links, and temporarily changes a spring constant of a variable rigidity bush which enables the hub bearing housing to turn in the toe-in direction or toe-out direction, at an early stage of turning by changing the spring constant.

* * * * *